US011280676B2

(12) United States Patent
Hong et al.

(10) Patent No.: US 11,280,676 B2
(45) Date of Patent: Mar. 22, 2022

(54) OPTICAL SPECTROSCOPY USING THE FOURIER TRANSFORM

(71) Applicant: The Regents of the University of California, Oakland, CA (US)

(72) Inventors: Brandon Hong, La Jolla, CA (US); Abdelkrim El Amili, La Jolla, CA (US); Andrew Grieco, La Jolla, CA (US); Yeshaiahu Fainman, La Jolla, CA (US); Ang Li, La Jolla, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 16/957,065

(22) PCT Filed: Dec. 21, 2018

(86) PCT No.: PCT/US2018/067350
§ 371 (c)(1),
(2) Date: Jun. 22, 2020

(87) PCT Pub. No.: WO2019/126786
PCT Pub. Date: Jun. 27, 2019

(65) Prior Publication Data
US 2020/0348180 A1 Nov. 5, 2020

Related U.S. Application Data

(60) Provisional application No. 62/609,132, filed on Dec. 21, 2017.

(51) Int. Cl.
*G01J 3/453* (2006.01)
*G01J 3/02* (2006.01)
(Continued)

(52) U.S. Cl.
CPC ............. *G01J 3/453* (2013.01); *G01J 3/0213* (2013.01); *G01J 3/0229* (2013.01);
(Continued)

(58) Field of Classification Search
CPC ...... G01J 3/0286; G01J 3/0297; G01J 3/4535; G01J 3/0213; G01J 3/453; G01J 2003/2813; G02B 6/12004; G02B 6/12007
See application file for complete search history.

(56) References Cited

U.S. PATENT DOCUMENTS 7,538,891 B1 * 5/2009 Mello ................ G01B 11/2441
356/35.5
2004/0201850 A1 10/2004 Hajian et al.
(Continued)

OTHER PUBLICATIONS

ISA, International Search Report and Written Opinion for International Application No. PCT/US2018/067350, dated May 6, 2019. 12 pages.
(Continued)

*Primary Examiner* — Dominic J Bologna
(74) *Attorney, Agent, or Firm* — Perkins Coie LLP

(57) ABSTRACT

Devices, systems and methods for optical spectroscopy using a Fourier transform that improve measurement speed, and relax the sampling rate and dynamic range requirements compared to conventional techniques, are described. One exemplary method for optical Fourier transform spectroscopy includes receiving a broadband signal, spectrally partitioning the broadband signal to generate a plurality of spectral channel interferograms, computing a one-dimensional Fourier transform of a function of each of the plurality of spectral channel interferograms to generate each of a plurality of channel spectrums, and reconstructing a spectrum of the broadband signal based on the plurality of channel spectrums. Embodiments of the disclosed technol-
(Continued)

ogy include a free-space channel dispersed Fourier transform spectrometer and an integrated silicon-on-insulator Fourier transform spectrometer.

19 Claims, 17 Drawing Sheets

(51) Int. Cl.
    G02B 6/12      (2006.01)
    G01J 3/28      (2006.01)
(52) U.S. Cl.
    CPC .......... *G01J 3/0286* (2013.01); *G01J 3/0297* (2013.01); *G01J 3/4535* (2013.01); *G02B 6/12007* (2013.01); *G01J 2003/2813* (2013.01); *G02B 6/12004* (2013.01)

(56) References Cited

U.S. PATENT DOCUMENTS

| | | | | |
|---|---|---|---|---|
| 2007/0077595 | A1* | 4/2007 | Koo | G01J 3/0218 435/7.1 |
| 2012/0116703 | A1* | 5/2012 | Pavilion | G03H 1/0866 702/70 |
| 2014/0092385 | A1* | 4/2014 | Nitkowski | G01J 3/0218 356/326 |
| 2016/0097716 | A1* | 4/2016 | Gulati | A61B 5/7267 250/339.01 |
| 2016/0282184 | A1* | 9/2016 | Khalil | G01J 3/0256 |
| 2016/0341896 | A1* | 11/2016 | Horth | G02B 6/1228 |

OTHER PUBLICATIONS

Akca, B. I. Design of a compact and ultrahigh-resolution Fouriertransform spectrometer. Optics Express 25, 1487-1494 (2017).
Chrostowski, L. & Hochberg, M. Silicon Photonics Design (Cambridge University Press, Cambridge, 2015).
Coarer, E. et al. Wavelength-scale stationary-wave integrated Fourier-transform spectrometry. Nature Photonics 1, 473-478 (2007).
Coutant, O., et al. Fabry-Perot optical fiber strainmeter with an embeddable, low-power interrogation system. Optica 2, 400-404 (2015).
Crosnier, G. et al. Hybrid indium phosphide-on-silicon nanolaser diode. Nature Photonics 11, 297-300 (2017).
Della Corte, F. G., et al. Temperature dependence analysis of the thermo-optic effect in silicon by single and double oscillator models. Journal of Applied Physics 88, 7115-7119 (2000).
Dong, B. et al. Nano-Silicon-Photonic Fourier Transform Infrared (FTIR) Spectrometer-on-a-Chip. In Conference on Lasers and Electro-Optics, STu4I.1 (Optical Society of America, 2015).
Dong, P. et al. Low loss shallow-ridge silicon waveguides. Optics Express 18, 14474-14479 (2010).
Dong, P. et al. Low power and compact reconfigurable multiplexing devices based on silicon microring resonators. Opt. Express 18, 9852-9858 (2010).
Erfan, M. et al. On-Chip Micro-Electro-Mechanical System Fourier Transform Infrared (MEMS FT-IR) Spectrometer-Based Gas Sensing. Applied Spectroscopy 70, 897-904 (2016).
Ferrari, M. et al. A brief review on the history of human functional near-infrared spectroscopy (fNIRS) development and fields of application. NeuroImage 63, 921-935 (2012).
Florjaczyk, M. et al. Development of a slab waveguide spatial heterodyne spectrometer for remote sensing. In Proceedings of SPIE, vol. 7594, 75940R-75940R-9 (2010). 10 pages.
Frey, B. J., et al. Temperature dependent refractive index of silicon and germanium. In Proceedings of SPIE—The International Society for Optical Engineering, vol. 6273 II (2006). 11 pages.
Griffiths, P. R. The Early Days of Commercial FT-IR Spectrometry: A Personal Perspective. Applied Spectroscopy 71, 329-340 (2017).

Hochberg, M. et al. Towards fabless silicon photonics. Nature Photonics 4, 492-494 (2010).
Kyotoku, B. et al. Sub-nm resolution cavity enhanced microspectrometer. Optics Express 18, 102-107 (2010).
Leviton, D. B. et al. Temperature-dependent absolute refractive index measurements of synthetic fused silica. In Proceedings of SPIE—The International Society for Optical Engineering, vol. 6273 II (2006).
Li, H. H. Refractive index of silicon and germanium and its wavelength and temperature derivatives. Journal of Physical and Chemical Reference Data 9, 561-658 (1980).
Li, J,-y., et al. Miniature Fourier transform spectrometer based on wavelength dependence of half-wave voltage of a LiNbO3 waveguide interferometer. Optics Letters 39, 3923 (2014).
Ma, X., et al. CMOS—compatible integrated spectrometer based on echelle diffraction grating and MSM photodetector array. IEEE Photonics Journal 5, 6600807 (2013).
Malik, A. et al. Ge-on-Si and Ge-on-SOI thermo-optic phase shifters for the mid-infrared. Optics Express 22, 28479-28488 (2014).
Nedeljkovic, M. et al. Mid-Infrared Silicon-on-lnsulator Fourier-Transform Spectrometer Chip. Photonics Technology Letters, IEEE 28, 528-531 (2016).
Nie, X., et al. CMOS—compatible broadband co-propagative stationary Fourier transform spectrometer integrated on a silicon nitride photonics platform. Optics Express 25, A409-A418 (2017).
Okada, Y. et al. Precise determination of lattice parameter and thermal expansion coefficient of silicon between 300 and 1500 K. Journal of Applied Physics 56, 314-320 (1984).
Patel, D. et al. High-speed compact silicon photonic Michelson interferometric modulator. Optics Express 22, 26788-26802 (2014).
Podmore, H. et al. Demonstration of a compressive-sensing Fouriertransform on-chip spectrometer. Optics Letters 42, 1440-1443 (2017).
Rahim, A. et al. Expanding the Silicon Photonics Portfolio With Silicon Nitride Photonic Integrated Circuits. Journal of Lightwave Technology 35, 639-649 (2017).
Redding, B., et al. Compact spectrometer based on a disordered photonic chip. Nature Photonics 7, 746-751 (2013).
Redding, B., et al. Evanescently coupled multimode spiral spectrometer. Optica 3, 956-962 (2016).
Reich, G. Near-infrared spectroscopy and imaging : Basic principles and pharmaceutical applications. Advanced Drug Delivery Reviews 57, 1109-1143 (2005).
Sabry, Y. M., et al. Monolithic siliconmicromachined free-space optical interferometers on chip. Laser & Photonics Reviews 9, 1-24 (2015).
Sedky, S., et al. Experimental Determination of the Maximum Post-Process Annealing Temperature for Standard CMOSWafers. IEEE Transactions on Electron Devices 48, 377-385 (2001).
Shen, L. et al. Mid-infrared all-optical modulation in low-loss germanium-on-silicon waveguides. Optics Letters 40, 268-271 (2015).
Subramanian, A. Z. et al. Silicon and silicon nitride photonic circuits for spectroscopic sensing on-a-chip. Photonics Research 3, 47-59 (2015).
Teng, C. C. et al. Fiber-pigtailed silicon photonic sensors for methane leak detection. In Conference on Lasers and Electro-Optics, AM3B.2 (Optical Society of America, 2017).
Volet, N. et al. Semiconductor optical amplifiers at 2.0-μm wavelength on silicon. Laser and Photonics Reviews 11 (2017).
Wan, N. H. et al. High-resolution optical spectroscopy using multimode interference in a compact tapered fibre. Nature Communications 7762 (2015).
Yun, H. et al. Broadband 2x2 adiabatic 3 dB coupler using siliconon-insulator sub-wavelength grating waveguides. Optics Letters 41, 3041-3044 (2016).
Yurtsever, G., et al. Ultra-compact silicon photonic integrated interferometer for sweptsource optical coherence tomography. Optics Letters 39, 5228-31 (2014).
Zhang, Y. et al. A compact and low loss Y-junction for submicron silicon waveguide. Optics Express 21, 1310-6 (2013).
Zhou, Z., et al. On-chip light sources for silicon photonics. Light: Science & Applications 4, e358 (2015).

(56) References Cited

OTHER PUBLICATIONS

Zortman, W. et al. Silicon photonics manufacturing. Optics Express 18, 23598-23607 (2010).

* cited by examiner

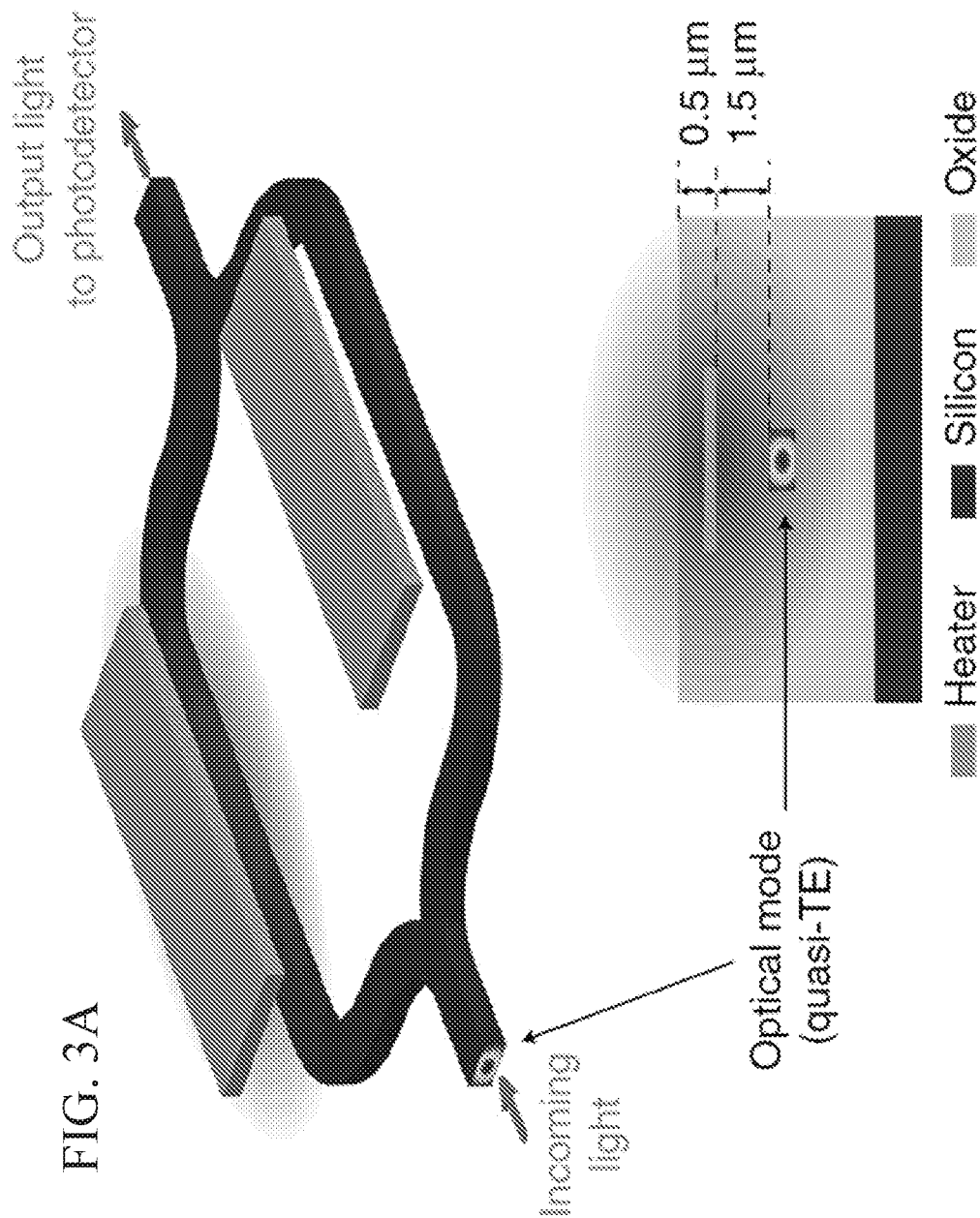

OPTICAL SPECTROSCOPY USING THE FOURIER TRANSFORM

CROSS-REFERENCE TO RELATED APPLICATION(S)

This patent document is a 371 National Phase Application of PCT Application No. PCT/US2018/67350 entitled "OPTICAL SPECTROSCOPY USING THE FOURIER TRANSFORM", filed on Dec. 21, 2018, which claims priority to and benefits of U.S. Provisional Patent Application No. 62/609,132 entitled "OPTICAL SPECTROSCOPY USING THE FOURIER TRANSFORM" filed on Dec. 21, 2017. The entire content of the aforementioned patent applications are incorporated by reference as part of the disclosure of this patent document.

TECHNICAL FIELD

The present document relates to optical spectroscopy, and more specifically, to channel dispersed Fourier transform (FT) spectroscopy.

BACKGROUND

Optical spectroscopy excels at chemical identification and is ubiquitous in the sciences as a highly specific and non-invasive probe of molecular structure. The integration of miniaturized optical spectrometers into mobile platforms will have unprecedented impact on applications ranging from unmanned aerial vehicles (UAVs) to mobile phones.

SUMMARY

Disclosed are devices, systems and methods for optical spectroscopy using the Fourier transform that improve measurement speed, and relax the sampling rate and dynamic range requirements compared to conventional techniques. This may be achieved by splitting the input signal spectrum into a number of bands, separately analyzing each of these bands using a Fourier transform spectrometer, and combining the outputs to generate a final spectrum.

In an exemplary aspect, the disclosed technology may be used to provide a method for optical spectroscopy. This method includes receiving a broadband signal, spectrally partitioning the broadband signal to generate a plurality of spectral channel interferograms, computing a one-dimensional Fourier transform of a function of each of the plurality of spectral channel interferograms to generate each of a plurality of channel spectrums, and reconstructing a spectrum of the broadband signal based on the plurality of channel spectrums.

In another example aspect, an apparatus for Fourier transform based optical spectroscopy comprises a plurality of filters configured to generate a plurality of spectral channel interferograms, wherein each of the plurality of filters is configured to filter a distinct spectral portion of an input broadband signal and generate one of the plurality of spectral channel interferograms, a plurality of Fourier transform spectrometers configured to generate a plurality of channel spectrums, wherein each of plurality of Fourier transform spectrometers is associated with a corresponding one of each of the plurality of filters, and wherein each of the plurality of Fourier transform spectrometers is configured to compute a Fourier transform of a function of each of the plurality of spectral channel interferograms and generate each of the plurality of channel spectrums, and a circuit for signaling processing configured to reconstruct a spectrum of the input broadband signal based on the plurality of channel spectrums.

In another exemplary aspect, the above-described method(s) are embodied in the form of processor-executable code and stored in a computer-readable program medium.

In yet another exemplary aspect, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIGS. 3A-3E show schematics and fabrication details for an integrated silicon-on-insulator (SOI) Fourier transform spectrometer.

DETAILED DESCRIPTION

Figures 1A, 1B:
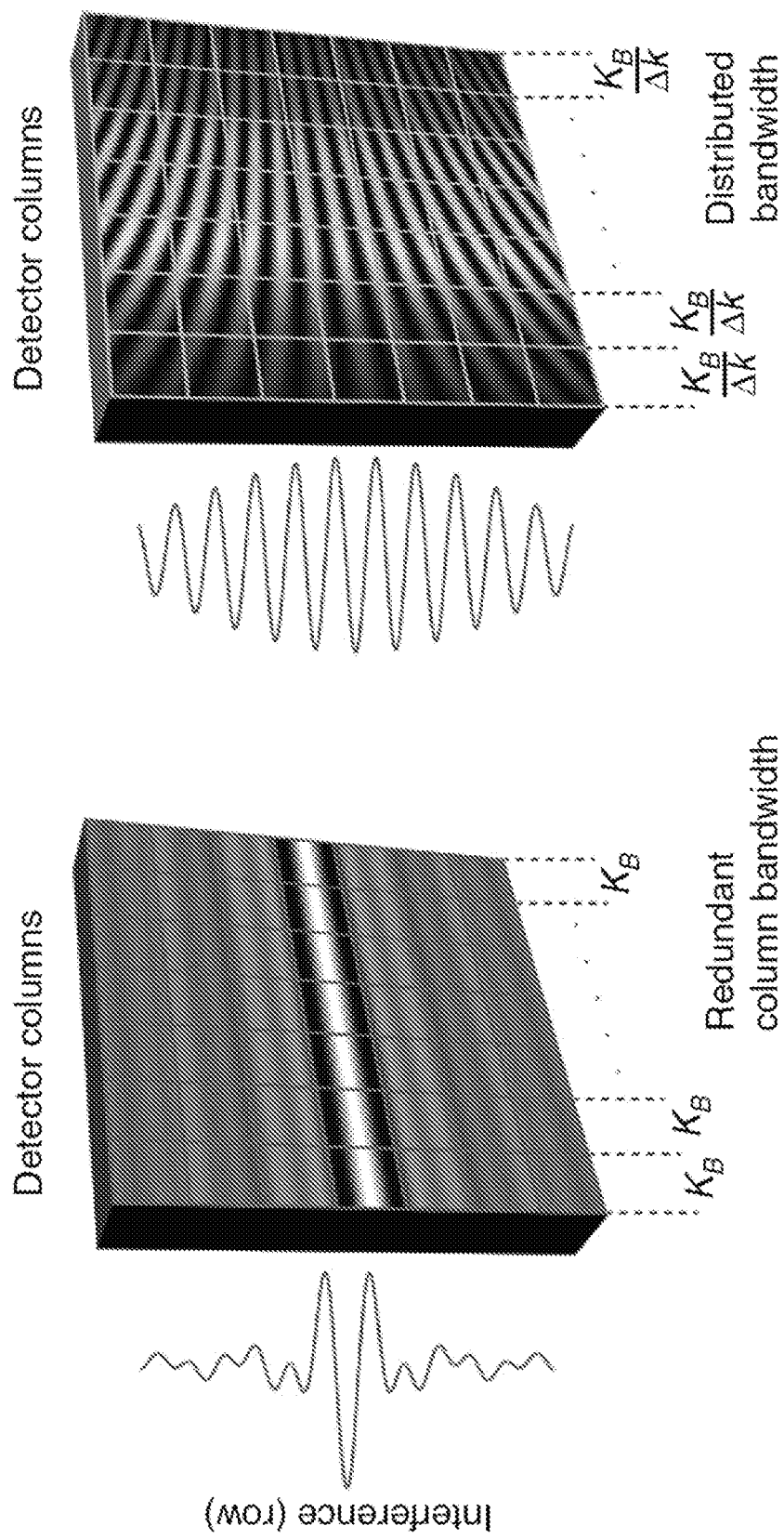
FIGS. 1A-1C show the frequency spectrum, the interferogram and the schematic diagram, respectively, of an exemplary channel dispersed Fourier transform spectrometer.

In recent years, significant efforts have been directed towards the realization of miniaturized, embedded optical spectrometers for spectral analysis in numerous areas of science and technology. The widespread use of optical spectroscopy from remote sensing, to planetary sciences, to medical research, and pharmaceutical processes strongly relies on the absorption, emission, scattering and/or reflection cross-sections of many compounds in the near-infrared (NIR) and mid-infrared (MIR) spectral range.

Optical Fourier Transform (FT) spectroscopy offers exceptional resolution and signal to noise ratio with high specificity for the analysis of trace chemical spectral signatures, but has thus far been relegated as a benchtop instrument owing to the large footprint and mechanical stability necessary for accurate operation. To make these instruments more stable, stationary FT spectrometers measure spectra without moving parts. However it will require to make compact the bulky topology of the traditional mirror-driven interferometers, without sacrificing their high resolution and signal fidelity characteristics.

While devices such as stationary Fourier transform spectrometers that use image acquisition of spatial interference patterns for spectrum recovery sample the entire autocorrelation interferogram and are compact, restrictions in their maximum achievable resolution imposed by their sampling geometry limited their widespread adoption.

Section headings are used in the present document to improve readability of the description and do not, in any way, limit the discussion to the respective sections only. Section headings are used only to facilitate readability and are not intended to limit the embodiments and technology described in each section only to that section. Furthermore, for ease of explanation, a number of simplifying assumptions have been made. Although these simplifying assumptions are intended to help convey ideas, they are not intended to be limiting.

Overview of Fourier Transform Spectroscopy (FTS)

The premise of FTS is that the interference patterns generated by an optical wave incident on certain devices can be interpreted as the Fourier transform of the optical power spectrum. Recognizing this, it become possible to measure the power spectrum indirectly simply by recording the interference pattern and then performing the inverse Fourier transform. To illustrate this process consider a simple Mach-Zehnder interferometer. This interferometer operates by splitting a broadband optical beam into equal parts, sending each part down a separate optical path, and finally recombining them. The total output intensity I of the recombined beam depends on the phase difference $\Delta\varphi$ between the recombined beams as follows:

$$I(\Delta\varphi) = \int_{-\infty}^{\infty} \rho(v) \cdot e^{i\Delta\varphi} dv$$

Here the total intensity may be calculated by integrating over the power spectral density $\rho$, wherein the frequency $v$ represents the spectral dependence of the quantities. In the case of an ideal Mach-Zehnder interferometer, the phase difference may be expressed as a product of the wavenumber and the path length difference $\Delta z$ such that $\Delta\varphi = 2\pi v \Delta z/c$. Here c is the speed of light. Substitution of this into the above equation results very clearly in the Fourier transform relationship between the power spectral density and autocorrelation interferogram:

$$I(\Delta z) = \int_{-\infty}^{\infty} \rho(v) \cdot \exp\left(\frac{i2\pi v \Delta z}{c}\right) dv = \mathfrak{F}^{-1}[\rho(v)]$$

$$\rho(v) = \int_{-\infty}^{\infty} I(\Delta z) \cdot \exp(-i2\pi v \Delta z/c) d\Delta z = \mathfrak{F}[I(\Delta z)]$$

The power density may therefore be recovered by first measuring the transmitted intensity of the interferometer as the path difference is changed, and finally performing the Fourier transform on the resulting autocorrelation interferogram.

In FTS, the high signal throughput has proved a boon to overcoming the difficulties of otherwise overwhelming detector noise in infrared spectroscopy and near-infrared Raman spectroscopy, and is desirable for in situ measurement. This is a strong motivation that has led to a proliferation of advanced FTS designs. The most notable recent developments include the channel dispersed FTS and the integrated silicon-on-insulator FTS.

As discussed above, operation of the FST includes splitting a broadband optical beam. In some embodiments, and for the silicon-on-insulator FTS, a distributed Bragg reflector (or Bragg grating) may be employed to partition and distribute input spectra.

The reflectance of a distributed Bragg reflector created by the periodic perturbation of a dielectric waveguide may be described in the context of coupled-mode theory. This formalism represents the permittivity profile of the periodic structure as the Fourier series:

$$\varepsilon(x, y, z) = \sum_m \varepsilon(x, y) \exp(-im 2\pi \Lambda z),$$

Herein, $\Lambda$ is the period of the perturbation and m is an integer. The full solution may then be written as a combination of propagating modes of the unperturbed waveguide. The effect of the perturbation is to transfer energy from one mode to another, but only when the difference between the signed propagation constants of the modes equals or comes close to $m2\pi/\Lambda$ for some m. This is known as the phase matching condition.

In Bragg reflectors, two modes of interest may be a forward propagating mode with propagation constant $\beta_F$ and a reflected mode with propagation constant $-\beta_B$. The number of other propagating modes is usually limited, and their propagation constants are not matched to either $\beta_F$ or $-\beta_B$ by any grating order, allowing the coupling into these modes to be neglected. The simplest case may occur in a single mode waveguide, for which the only possible match is $\beta_F = \beta_B$. In some embodiments, this single mode waveguide may be implemented using a series of Bragg filters. For example, a series of Bragg filters can be used to generate spectral sub-band signals from a broad band input signal.

Furthermore, a general observation can be made regarding the mode coupling induced by a Bragg reflector. In particular, due to the stringency of the phase matching condition, the coefficients of reflection and transmission have a strong spectral dependence. Since the propagation constants are wavelength dependent, this means that coupling occurs only over a narrow wavelength band.

Exemplary Embodiments for Channel Dispersed FTS

To improve the spectral resolution of stationary FT spectrometers, a channel dispersed Fourier transform (CDFT) spectrometer that records two-dimensional spatial interferograms using imaging detectors in a single-frame snapshot to recover high-resolution spectra is introduced.

By spectrally dispersing the one-dimensional interference pattern, an array of bandlimited interferograms is measured in real time, relaxing sampling constraints within each spectral channel. Bandlimited channels also reduce centerburst contrast, lowering the quantization noise set by detector dynamic range.

The CDFT spectrometer can be understood as an extension of the stationary FT spectrometer. For stationary FT spectrometers, the 1D interferogram spans a detector column by path delay as shown in FIG. 1A, and for a zero path delay (or center burst) at the column center, the total path difference is inversely proportional to the minimum resolvable spectral element. The sampling rate is determined by the optical path difference equal to pixel pitch, or equivalently, the number of detector pixels sampling the interferogram. For a two-sided spectrum signal bandwidth of $K_B$ and a desired resolution $\Delta k$ the following equation is valid:

$$N_{px} > \frac{K_B}{\Delta k}.$$

Herein, $N_{px}$ is the number of pixels along the interferogram direction. Hence, for a fixed signal resolution, decreasing signal bandwidths results in a stationary FT spectrometer with lower pixel density in fixed-size detector arrays in order to recover the spectrum without aliasing.

The CDFT spectrometer design optically disperses the one-dimensional interferogram pattern across a two-dimensional detector array. In some embodiments, the spectral dispersion can be generated by prism, diffractive element, or any similar dispersive spectral mapping component. With the spatial interference pattern oriented along the detector columns, the pattern image is dispersed perpendicularly in horizontal direction and resolved along the rows of the detector array. In this two-dimensional interference pattern, shown in FIG. 1B, each column interference pattern, or "spectral channel" is formed by a sub-band of the signal spectrum and can be Fourier transformed to recover the sub-band spectrum. After processing for carrier frequency aliasing and background, the recovered sub-band spectra can be added to recover the full signal power spectrum. While each spectral channel can be of a single-pixel width, channels with multi-pixel widths can be binned to a column with single-pixel width. Once the spectral channels are defined, the band limits are determined by both the dispersion angle subtended by the column extent. For a total signal bandwidth spread evenly across $N_{py}$ spectral channels, the tradeoff can be described as follows:

$$N_{px} > \frac{K_{B,channel}}{\Delta k} = \frac{K_B}{\Delta k N_{py}} \Leftrightarrow N_{px} N_{py} > \frac{K_B}{\Delta k}.$$

Since each spectral channel bandwidth now occupies a smaller fraction of the total signal bandwidth, the minimum number of pixels along the interference axis needed to avoid aliasing is now lowered by the number of channel divisions $N_{py}$.

Through spectral dispersion, the bandwidth per channel is reduced by the number of channels partitioning the total signal bandwidth; the minimum sampling rate of the interference pattern in each channel is reduced by the number of pixels (or channels) in the introduced detector axis, and the interferogram window can be increased proportionally to maximize the spectral resolution.

To calibrate bandpass sampling, an unwrapping algorithm is performed by passing two known spectrally separate and narrowband sources through the CDFTS system and extrapolating the spectral dispersion across the camera. As the interference angle is increased from co-linear to highly sheared, the fringe density is increased, and the calibration source lines increase in sampling frequency towards the Nyquist edge. As the interference angle is further increased, wrapping is observed, wherein the lines cross the sampling edge and fold back into the sampling space, moving back towards DC (this is undersampling). For each angle, a linear correspondence is made between the discrete wavenumber [pix$^{-1}$] spacing of the measured sources and the known spectral frequency spacing of the sources. Absolute wavenumber position is established by the known center frequency of each source. The number of wraps can be measured by sweeping the interference angle and observing the two spectral lines.

In practice, the shearing angle of the interference pattern may be chosen such that the channel bandwidth is not itself aliased. In particular this is the condition that an integer multiple of the sampling rate does not directly fall into the channel band, this condition can be met by translational alignment of the detector along the dispersion axis, or by fine tuning of the shearing angle to move the sampling rate to a channel band edge. Moreover, the system optical transfer function lower bounds the minimum resolvable linewidth. While the interior angle of the interference waves can be increased within the bandpass sampling limit, system apertures will restrict the visibility of higher spatial frequency components of the FT interferometric pattern, and lower the SNR of high frequency components in the recovered spectra. Moreover, wideband system noise (both shot and detector) is itself aliased in bandpass sampling, and noise is introduced into the signal band with decreasing sampling rates to further lower the SNR.

Figure 1C:
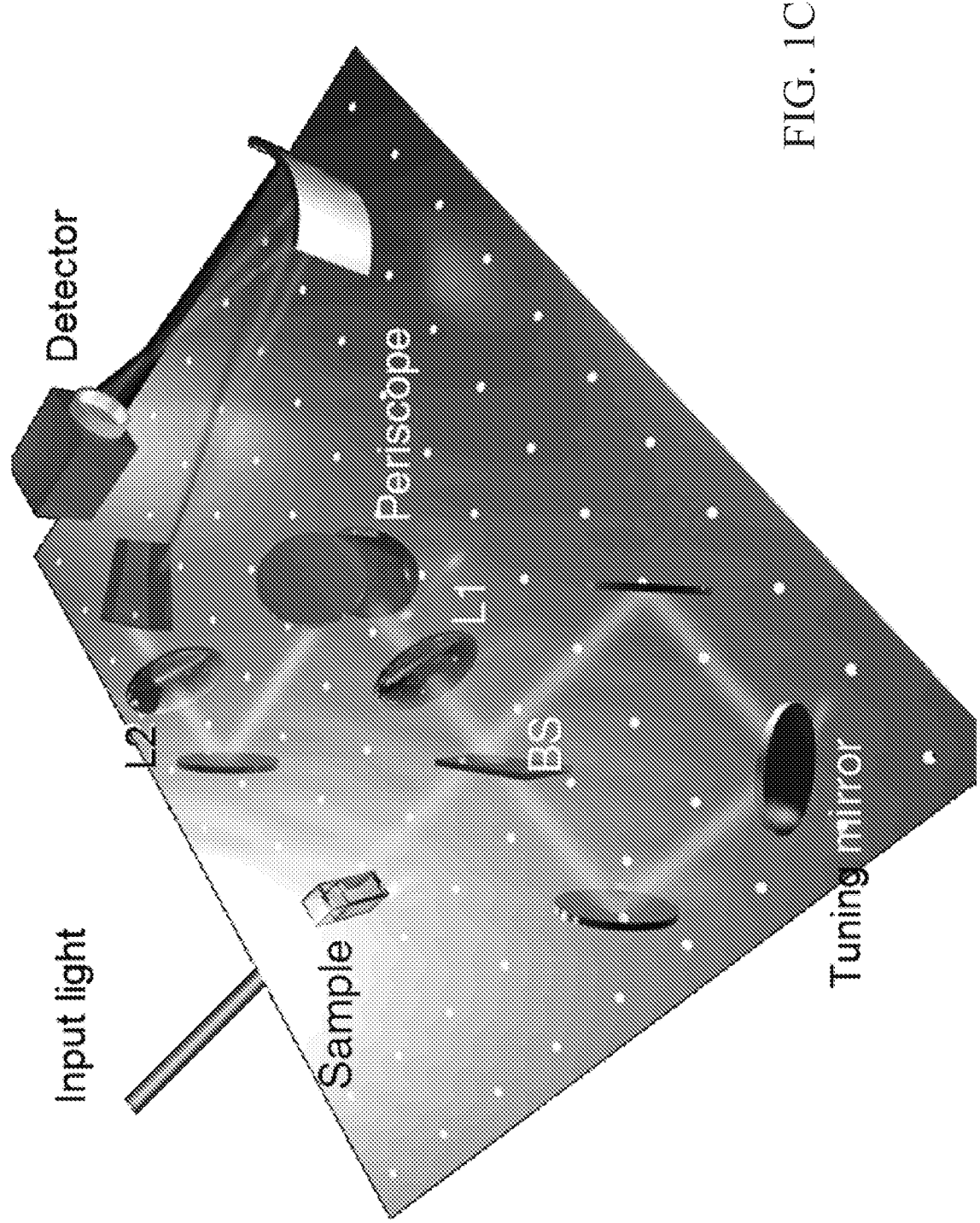

An exemplary implementation of CDFT spectrometer is shown in FIG. 1C. As shown therein, an interferometric arm based on a Sagnac interferometer splits a collimated signal beam into two beams with an interior interference angle proportional to the tuning mirror tilt; at 45° to the beam path, optical beams exiting the ring are collinear, and for tilt displacements of θ, the interior angle of the emerging beams will be 2θ. This topology has been thoroughly studied as an interferometer and stationary FT spectrometer.

The typical stationary FT spectrometers interference pattern is shown schematically in FIG. 1A. Based on the interior angle, control of the tuning mirror tilt allows for variable shearing of the counter-propagating beams in the Sagnac ring and thus fringe density in the final interferogram. While the Sagnac generated interference plane is initially along the table, a periscope element rotates the plane by 90° out of the table prior to prism input; the interference plane is then perpendicular to the table. A prism is used to spectrally disperse the broadband spatial interference pattern into a spread array of bandlimited interference patterns, and is resolved by an imaging camera. Recorded interferograms are then binned into spectral channels, and 1D Fourier transforms of the channel interferograms are computed by fast Fourier transform (FFT) in MATLAB; high pass filters are applied to each channel interferogram to remove out-of-band baseline noise spectra while preserving in-band channel components. For low sampling rates, aliased spectral channels are unwrapped from un-aliased components into an empty half space and summed to reconstruct the complex spectrum; recovery of the power spectrum is obtained from the spectral magnitude.

One of the advantages of CDFT spectrometers is in measuring broadband spectra with narrow spectral features. In an example, this technique may be used to evaluate the spectrum of a broadband xenon arc lamp output from a Michelson interferometer. Increasing displacement of the delay mirror from the point of zero optical path difference introduces a sinusoidal modulation of the optical spectrum with increasing spectral fringe density. This technique is the basis for depth imaging in spectral domain optical coherence tomography, for spectral evaluation, and it is useful for generating arbitrarily dense spectral features over a broad signal bandwidth. In this experiment, the broadband signal is used to demonstrate the effect of aliasing in undersampled interferograms of stationary FT spectrometers, and how channel dispersion in CDFT spectrometers can recover and restore the narrow spectral features.

Figure 2A:
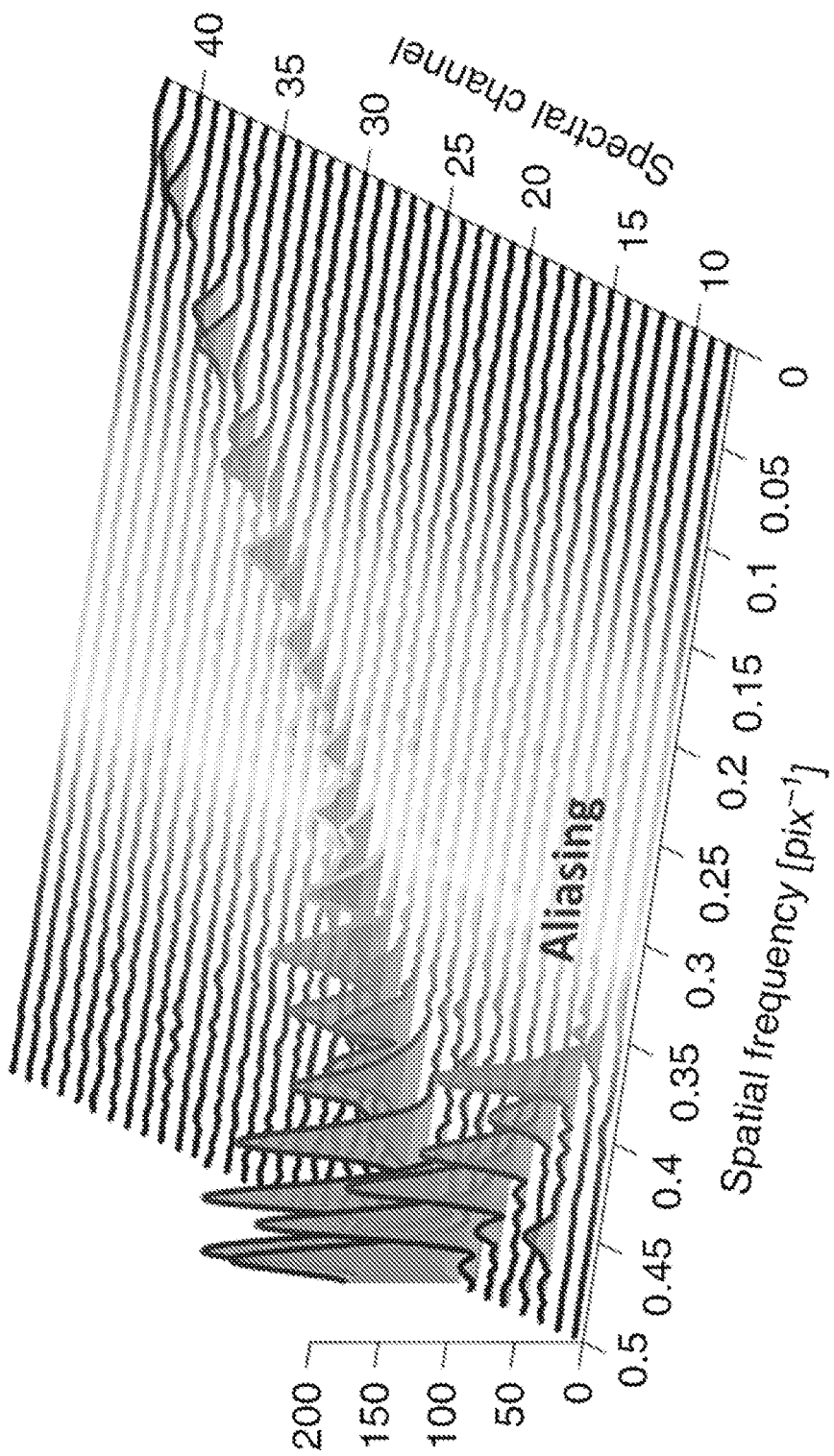
FIGS. 2B-2D show exemplary interferograms and reconstructed spectrums illustrating the effect of aliasing and unwrapping for the CDFT spectrometer.
Figure 2B:
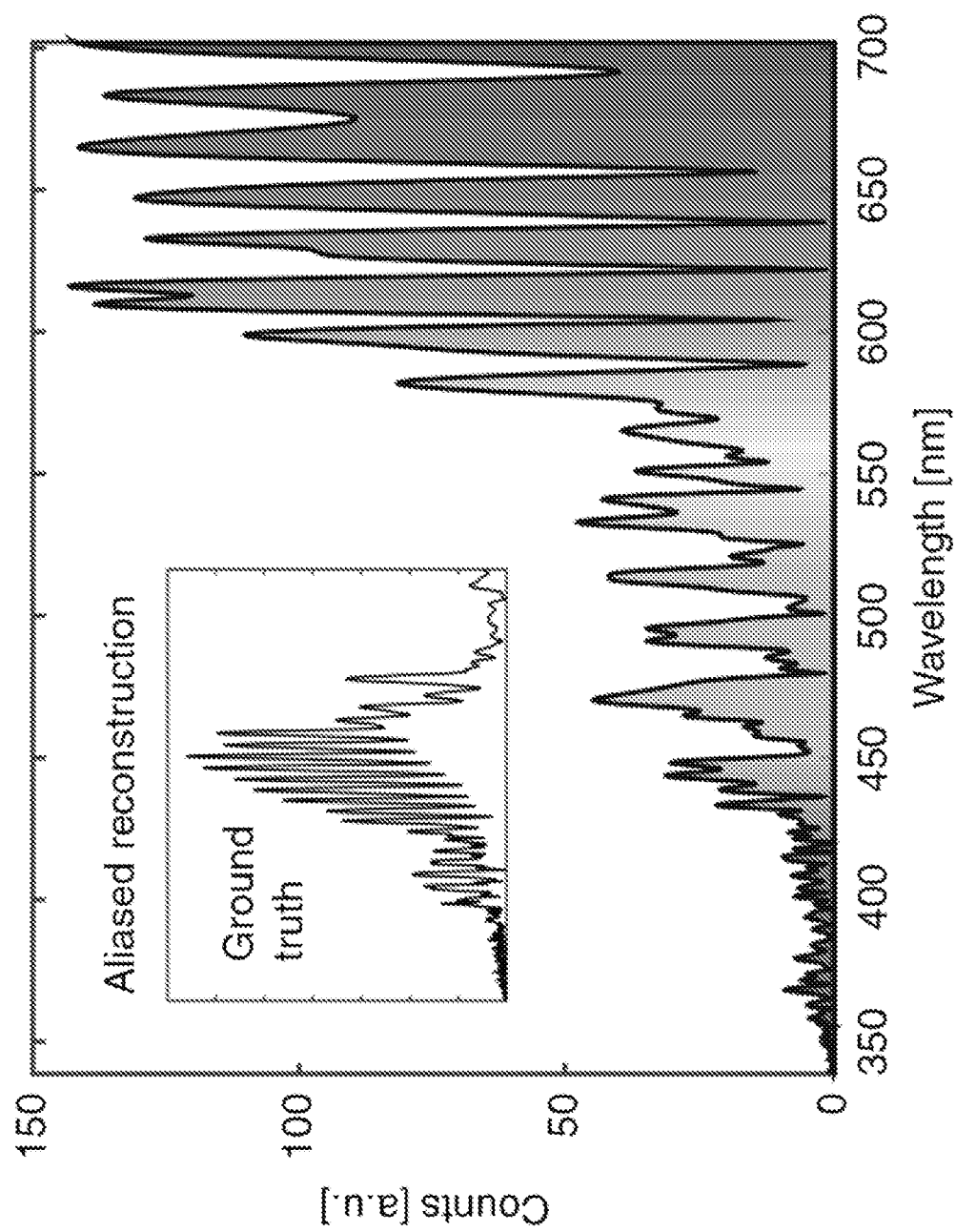
Figure 2C:
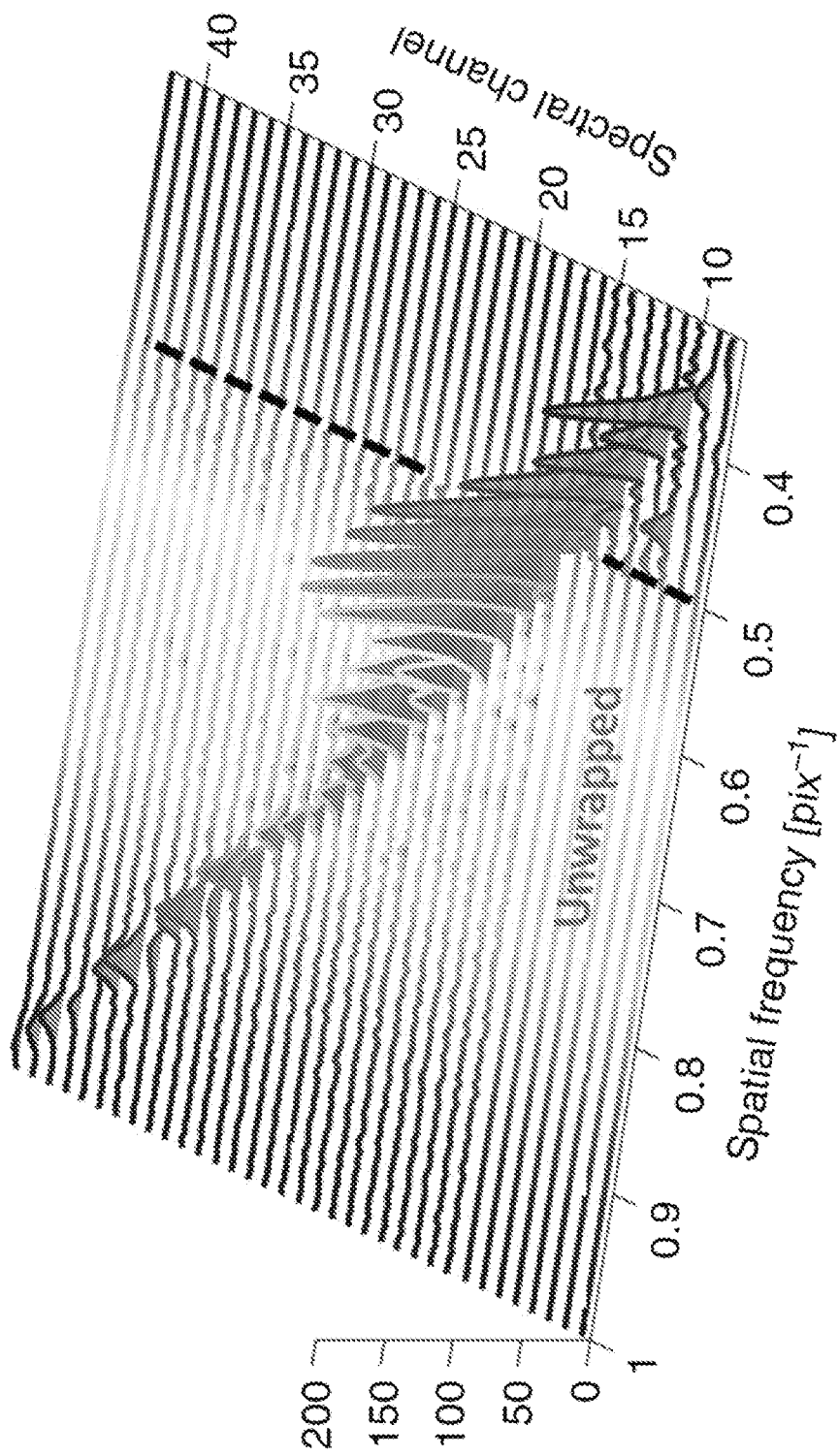
Figure 2D:
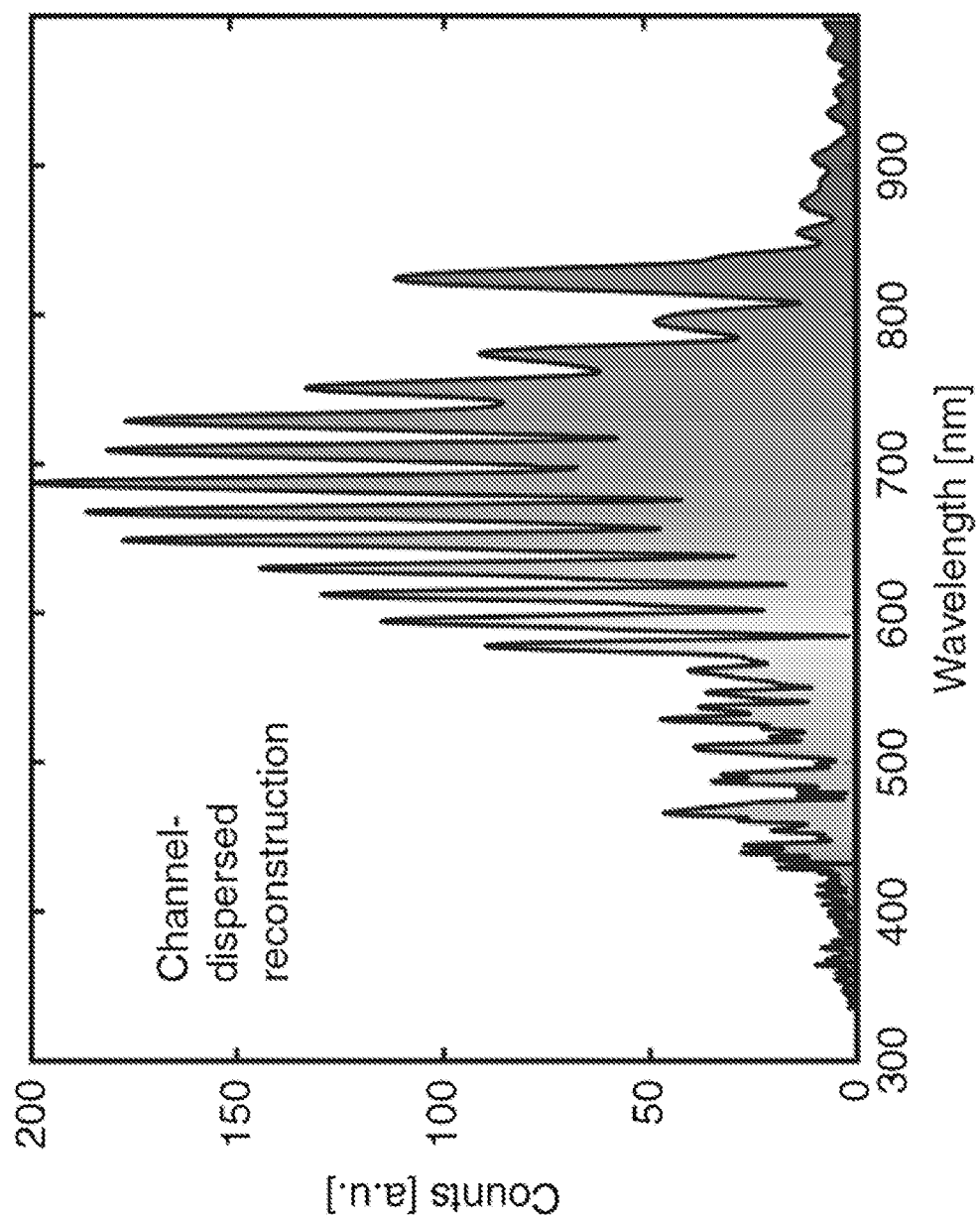

The CDFT sampling advantage is evident in low-pixel-density detectors where undersampling occurs. This sampling advantage can be shown in the experimental recovery of a 128×300 (row, column) format CDFT interferogram, where using a 1D stationary spectrometer of the longest pixel dimension is insufficient to sample the entire 500 nm bandwidth of the visible band while retaining the single nanometer features. At the same shearing angle as before for identical spectral resolution, the binning of the native detector format brought the signal to a 128×300 format is obtained with each column as a spectral channel sampling the interference pattern with 300 detectors. After zero-padding interpolation as before, the channel spectra are recovered by FFT and shown in magnitude in FIG. 2A: here, the low-density of pixels shows aliasing to occur for small signal wavelengths. As a result of undersampling, simple summation (FIG. 2B) of the channel spectra results in an aliased signal spectrum, identical to 1D stationary FT spectrometer signal recovery. Since the channel center-frequencies are linearly dispersed, the wrapping or "reflecting" of the dispersion back into the sampling bandwidth is symptomatic of aliasing and cannot generally be distinguished for dense spectra in the 1D case. Owing to the channel separation in CDFT interferograms, these wrapped spectral channels can be uniquely separated from overlapping channels, and unwrapped or reflected across the Nyquist frequency into an empty half space as in FIG. 2C. Following this processing, the channel summation of recovered sub-bands can be repeated, and the alias-free CDFT recovery of the total spectrum is shown in FIG. 2D.

In some embodiments, and through dispersion, the total signal bandwidth in a single interferogram can be divided into subbands that can sample the interferogram at a lower rate without aliasing. In particular, for a given number of pixels $N_{py}$ along the interferometric axis, the critical Nyquist sampling rate can be lowered by a factor of $N_{px}$, the number of dispersion channels. This allows the detector to measure proportionally larger path delays to allow for a resolution increase by a factor of $N_{px}$. While the carrier frequency, or channel center frequency, is more readily aliased as a value invariant with the number of spectral channels, knowing the dispersion center in each channel allows the recovered spectra to be uniquely unwrapped from about the Nyquist edges and restored without aliasing. For highly undersampled interferograms, aliasing can potentially occur across both Nyquist edges, and more rigorous methods for spectral unwrapping will be necessary. To calibrate this process, the center frequency for each sub-band can be followed in each channel as the interference angle increases, and at the target angle for the desired spectral resolution, the center frequency of each sub-band will determine the number of reflections to make across each Nyquist edge.

In the context of the CDFT spectrometer described above, it is seen that spectral dispersion of the 1D stationary FT interferogram allows for the interferogram to be undersampled in proportion to the number of spectral channels introduced. CDFT spectral evaluation allows for high spectral resolution to be achieved for stationary infrared FT spectrometers in a format native to sensitive low-pixel-density imagers that populate much of the mid-IR and far-IR range. Conversely, with the reduced dependence on linear pixel-density, high pixel-density imagers in the visible and NIR can be partitioned for hyperspectral imaging by integration with a compact implementation of parallel CDFT spatial filters. Moreover, high speed cameras that scan rapidly over a limited number of detector elements can also benefit from channel dispersion, and in applications such as optical coherence tomography, CDFT spectrometers can improve the speed of A-scan readouts in the spectral domain without sacrificing dynamic range or resolution.

In some embodiments, a device for optical spectroscopy using a Fourier transform comprises a Sagnac interferometer comprising a first beam splitter, the first beam splitter positioned to receive light from a light source, a first lens positioned to receive light from the first beam splitter, a periscope positioned to receive light that has passed through the first lens, a second lens positioned to receive light from the periscope, a dispersive element positioned to receive light that has passed through the second lens, and a detector, comprising an imaging sensor, positioned to receive light that has been dispersed by the dispersive element, wherein the imaging sensor is configured to binning the light that has been dispersed into a plurality of spectral channels, computing a one-dimensional Fourier transform of each spectral channel to produce each of a plurality of channel spectrums, and reconstructing a spectrum associated with the light source based on the plurality of channel spectrums.

The embodiment described above is not limited by only the components enumerated in the description of the above device. There may be intervening elements between two elements that are encompassed by the presently described technology. Furthermore, the described elements may possess some inherent or inferred properties or characteristics.

In an example, the second lens may receive the light from the periscope after the light has been reflected by a steering mirror.

In another example, the dispersive element may be a Pellin-Broca prism.

In yet another example, the light that has been dispersed comprises a spectrally dispersed interference pattern. In yet another example, the detector may receive the light that has been dispersed after the spectrally dispersed interference pattern is resolved by a cylindrical mirror with a curvature in a dispersion plane.

In yet another example, the first lens may form an intermediate spatial Fourier transform plane.

In yet another example, the imaging sensor may include a complementary metal-oxide-semiconductor (CMOS) with a 5.6 micron square pixel pitch.

Exemplary Embodiments for Integrated Silicon-On-Insulator FTS

Embodiments of the disclosed technology include an implementation of a Si-FTS on the SOI platform with integrated microheaters. The Si-FTS shows intrinsic resilience to fabrication variations that allows scalability of its resolution and power consumption performance, enabling robust and versatile portable spectrometers.

Figure 3D:
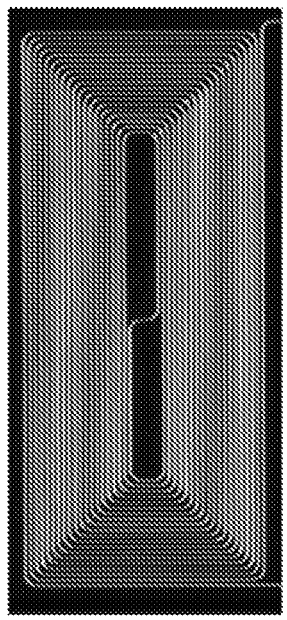
Figure 3E:
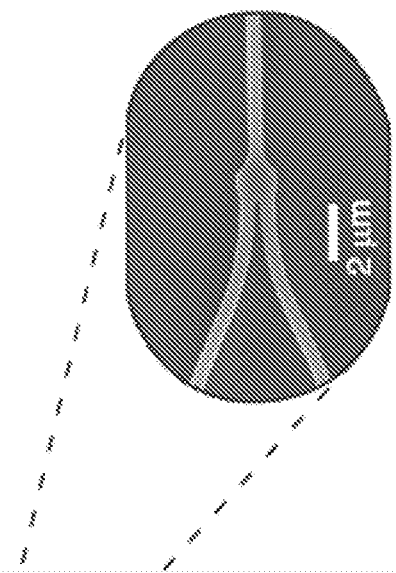
Figure 3C:
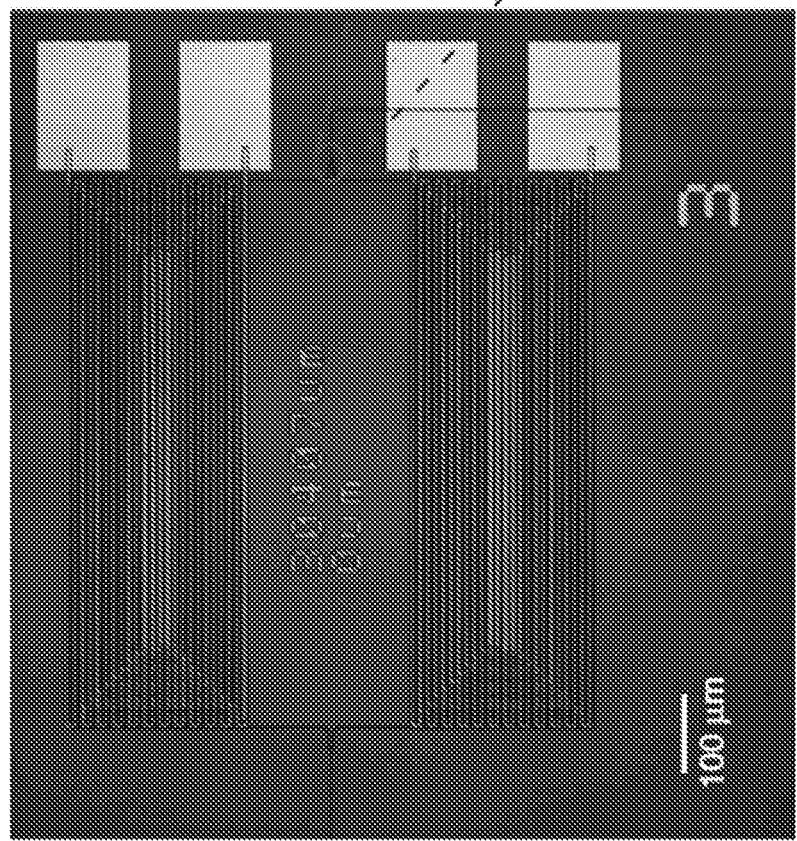

The device shown in FIG. 3A consists of a standard Mach-Zehnder Interferometer (MZI) integrated with metal microheaters fabricated in full compatibility with standard silicon photonics foundry processes. The external light is buttcoupled into and out of the chip using inverse tapers and adiabatically transitions to the highly confined quasi-TE mode of the access strip waveguide before splitting in the two arms of the interferometer and subsequently recombining into the output waveguide through broadband y-branch couplers (FIG. 3E). The output light is coupled out of chip directly into a photodetector. Each arm of the MZI consists of a spiral (FIG. 3D) with total length of 30.407 mm and is covered by independently actuated nichrome microheaters. The propagation losses of the waveguides are estimated to be around 2 dB cm$^{-1}$. The total device footprint is 1 mm$^2$.

Embodiments of the integrated silicon-on-insulator FTS are based on a modified FT relation between the varying optical power at the output of the MZI, I, and the PSD of the incoming light, PSD (v).

The operation of the Si-FTS includes a simple data acquisition step consisting of measuring the output power as a function of the phase difference $\Delta\phi$ between the two arms of the MZI. The $\Delta\phi$-dependent term is given by $$I(\Delta\phi) = \int_{-\infty}^{\infty} T(v) PSD(v) e^{j\Delta\phi(v)} dv.$$

Herein, v is the optical frequency and $T(v)$ is the transfer function of the MZI—ideally 1. The phase difference is $$\Delta\phi(v) = \frac{2\pi v}{c} [n_{eff,1}(v) L_1 - n_{eff,2}(v) L_2].$$

Herein, c is the speed of light, $n_{eff,i}$ and $L_i$ are the effective index and the total length of arm i.

This discussion is facilitated by first considering the response of an idealized device. In this case $T(v)=1$, the two arms are identical with length L, the effective indices are identical and dispersionless, $n_{eff,i}(v) \equiv n_{eff}$, and the effective index change due to temperature change $\Delta T$ depends only on a linear thermo-optic coefficient (TOC) $\partial_T n$, such that $\Delta n_{eff} = \partial_T n \Delta T$. The time delay between the arms of the MZI is defined as $\tau = (L/c) \cdot \partial_T n \Delta T$ and the phase difference is simply $$\Delta\phi(v) = 2\pi v \tau.$$

The phase difference in the form $2\pi \times$frequency$\times$delay establishes a direct FT relation between $I(\tau)$ and PSD(v), with the conjugate variables v and $\tau$, $$I(\tau) = \int_{-\infty}^{\infty} PSD(v) e^{j2\pi v \tau} dv = F[PSD(v)].$$

Herein, F[•] denotes the Fourier transform. Thus, PSD(v) can be directly obtained from the inverse FT (IFT) of the interferogram, $$PSD(v) = \int_{-\infty}^{\infty} I(\tau) e^{-j2\pi v \tau} d\tau = F^{-1}[I(\tau)].$$

In practice, the Si-FTS with thermal tuning includes other effects that must be taken into account. First, the strong mode dispersion of silicon waveguides causes significant frequency dependence on the effective index. Second, a large temperature excursion is required to achieve large phase imbalances and the non-linearity of the thermo-optic response must be considered. The large temperature excursion also induces changes in the arm length ($\Delta L$) due to thermal expansion. Finally, chip-scale variability and fabrication imperfections often introduce small differences between the two arms of the MZI, which are identical by design. Such variations may affect the arm length ($\delta L$) as well as the effective index ($\delta n(v)$).

As in free space, the Si-FTS must be calibrated to provide good absolute frequency accuracy. In addition, parameters $\xi 1$, $\gamma 2$, and $T(v)$ should also be ideally determined in a calibration step. A calibration process realized with a narrow linewidth tunable laser source allows to address all these requirements.

First, the calibration of the absolute optical frequency, $\xi 1$ and $\gamma 2$ is achieved measuring the interferogram of the laser source at different laser frequencies (at least three) in the spectral region of interest. Calibrating the absolute optical frequency reduces to determining $\kappa\tau$ that connects the electric power dissipated in the heater with the resulting arm delay, $\tau = \kappa\tau W$. $K(v)$ and $\gamma W$ can be determined for each heater (H1 and H2) curve-fitting the experimental interferograms using a cosine with non-linear argument. The linear fit of $K(v)$ allows the determination of $\kappa\tau$ for each heater and $\xi 1$. Finally, using $\kappa\tau$, $\gamma 2 = \gamma W / \kappa\tau$ can be obtained.

Figure 4A:
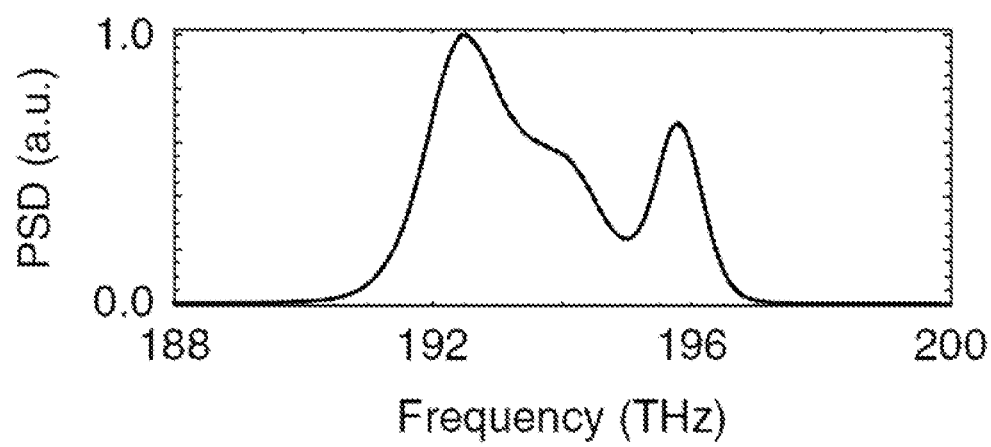
FIGS. 4A-4F show plots that illustrate the effectiveness of broadband spectrum recovery with the integrated SOI FTS.
Figure 4B:
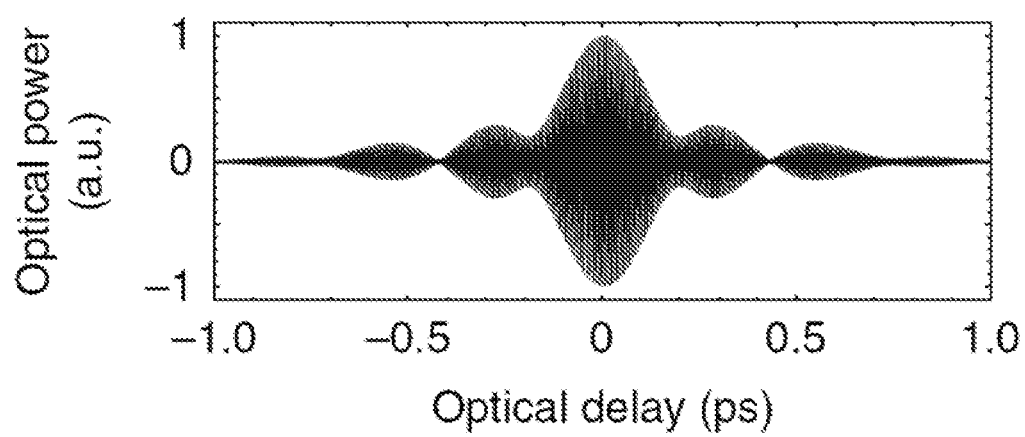

The Si-FTS is validated by recovering the spectrum of the amplified spontaneous emission (ASE) of a C-band erbium-doped fiber amplifier (EDFA). The ASE provides a good test spectrum in the telecom band, suitable for testing with the available equipment in our lab. Also, the broad features of the ASE spectrum are suitable for this demonstration given the limited resolution achieved here (0.38 THz). The reference ASE spectrum, measured with a tabletop optical spectrum analyzer, is shown in FIG. 4A, and its theoretical ideal interferogram for a dispersionless, perfectly balanced Si-FTS is depicted in FIG. 4B.

Figure 4C:
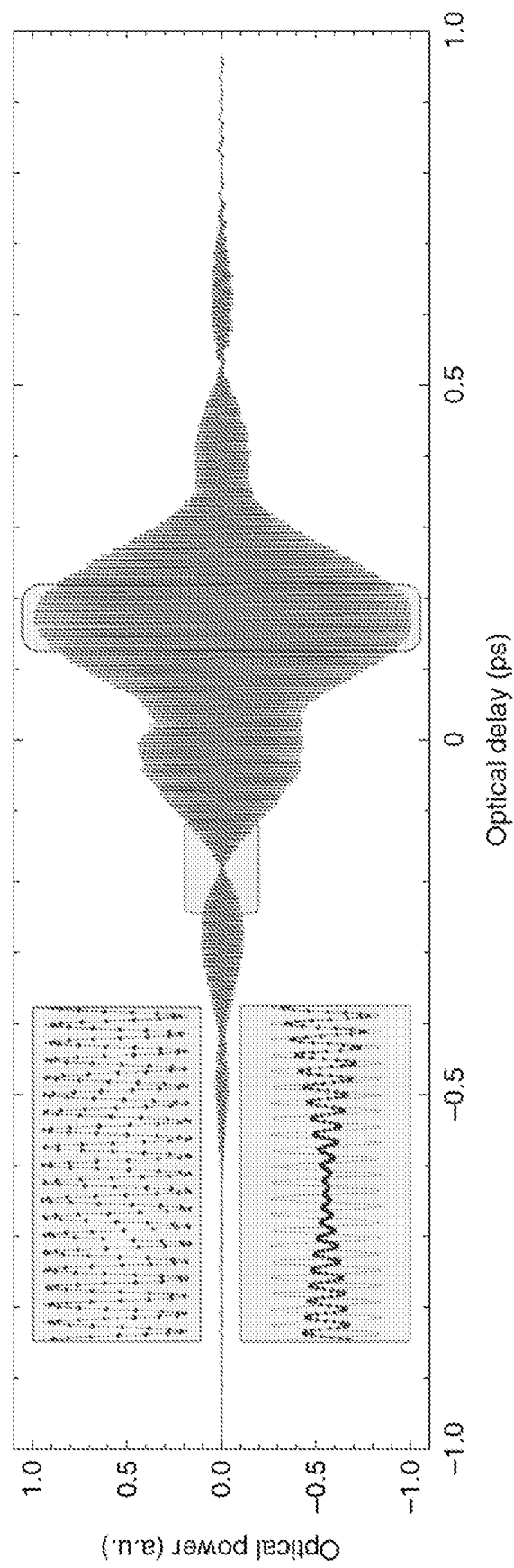
Figure 4D:
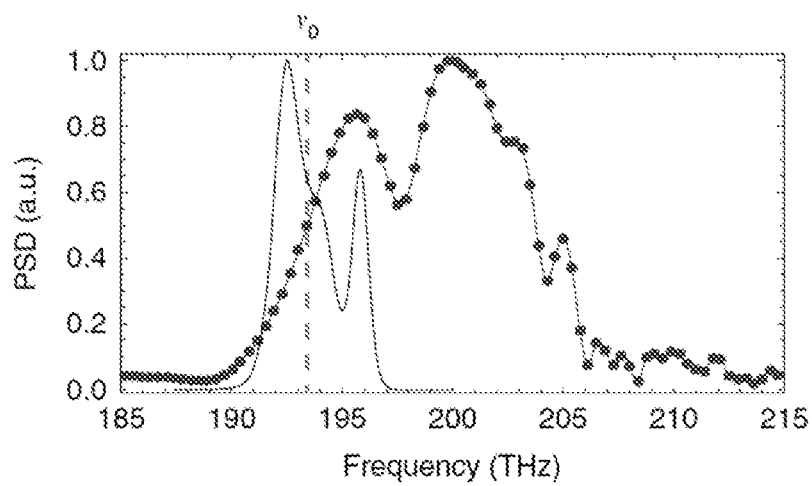
Figure 4E:
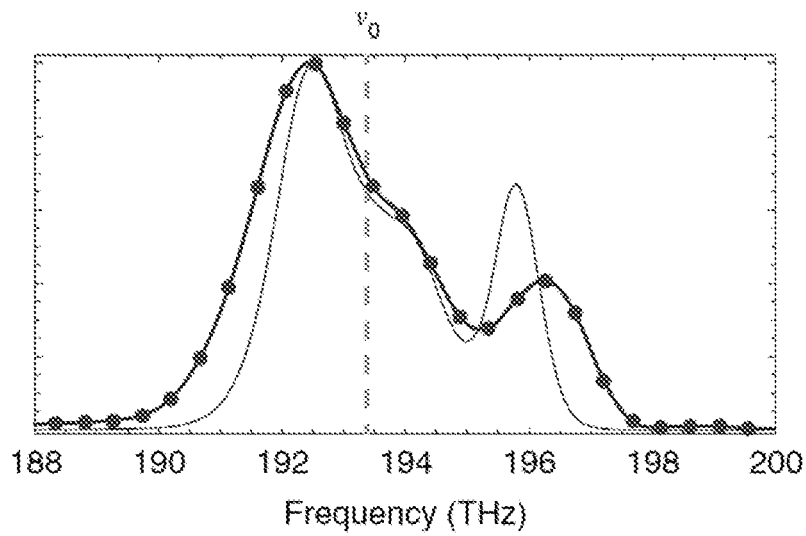
Figure 4F:
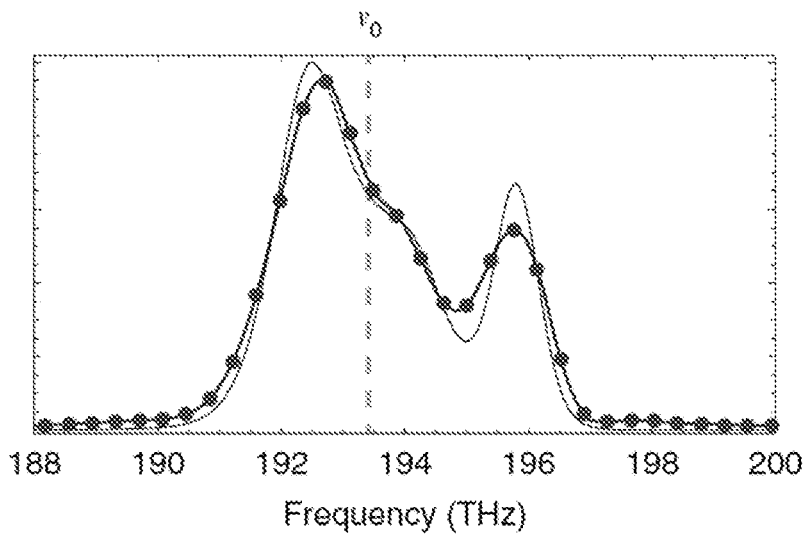

The PSD obtained from the experimental interferogram and the effects of thermo-optic non-linearity ($\gamma_2$), dispersion ($\xi_1$), and MZI transfer function ($T(v)$) are presented in FIGS. 4D-4F.

The PSD obtained directly form the as-measured interferogram—with the delay axis corresponding to $\tau$ and without performing any correction—is presented in FIG. 4D. The TOC non-linearity distorts, broadens, and shifts the PSD to higher frequencies as the interferogram oscillates faster with increasing delay. After the optical delay axis of the interferogram is properly transformed to T, the resulting PSD becomes very similar to the reference spectrum (FIG. 4E). Both resolved peaks are clearly identified and the unresolved peak is also present around 194 THz. However, since the spectrum has not been re-scaled to the original frequency v, it is broadened by the factor $1+\xi_1$ around v0. In addition, since it has not been re-normalized by $T(v)$, the high frequency peak appears attenuated relatively to the low frequency peak. The PSD corrected for the thermo-optic non-linearity, dispersion, and the MZI transfer function reproduces satisfactorily well the reference spectrum (FIG. 4F).

The ultimate performance of the on-chip Si-FTS is quite promising considering recent advancements in silicon photonics design and fabrication. First, the window of operation for a given device will be dictated by the finite bandwidth of the waveguide optical power couplers/splitters. Such components offering flat optical response over tens of terahertz (hundreds of nanometers) and extremely low excess loss may allow Si-FTS operating over large bandwidths. Second, fine spectral resolution could be achieved using long low-loss silicon waveguides fabricated in tight footprints combined with high temperature excursions endured by CMOS-compatible silicon devices. Finally, the power efficiency can be significantly improved by applying suitable design changes. For instance, using Michelson interferometers instead of MZIs can double the optical path in a given footprint, while introducing heat isolating structures can significantly increase heating efficiency.

In addition to high performance, a valuable advantage of the Si-FTS compared to other on-chip spectrometer approaches is its robustness to fabrication variations. Although the interferogram is strongly affected by the difference in effective index between the arms of the MZI (FIG. 4C), as previously discussed, the PSD remains unaffected (FIG. 4F).

Figure 5:
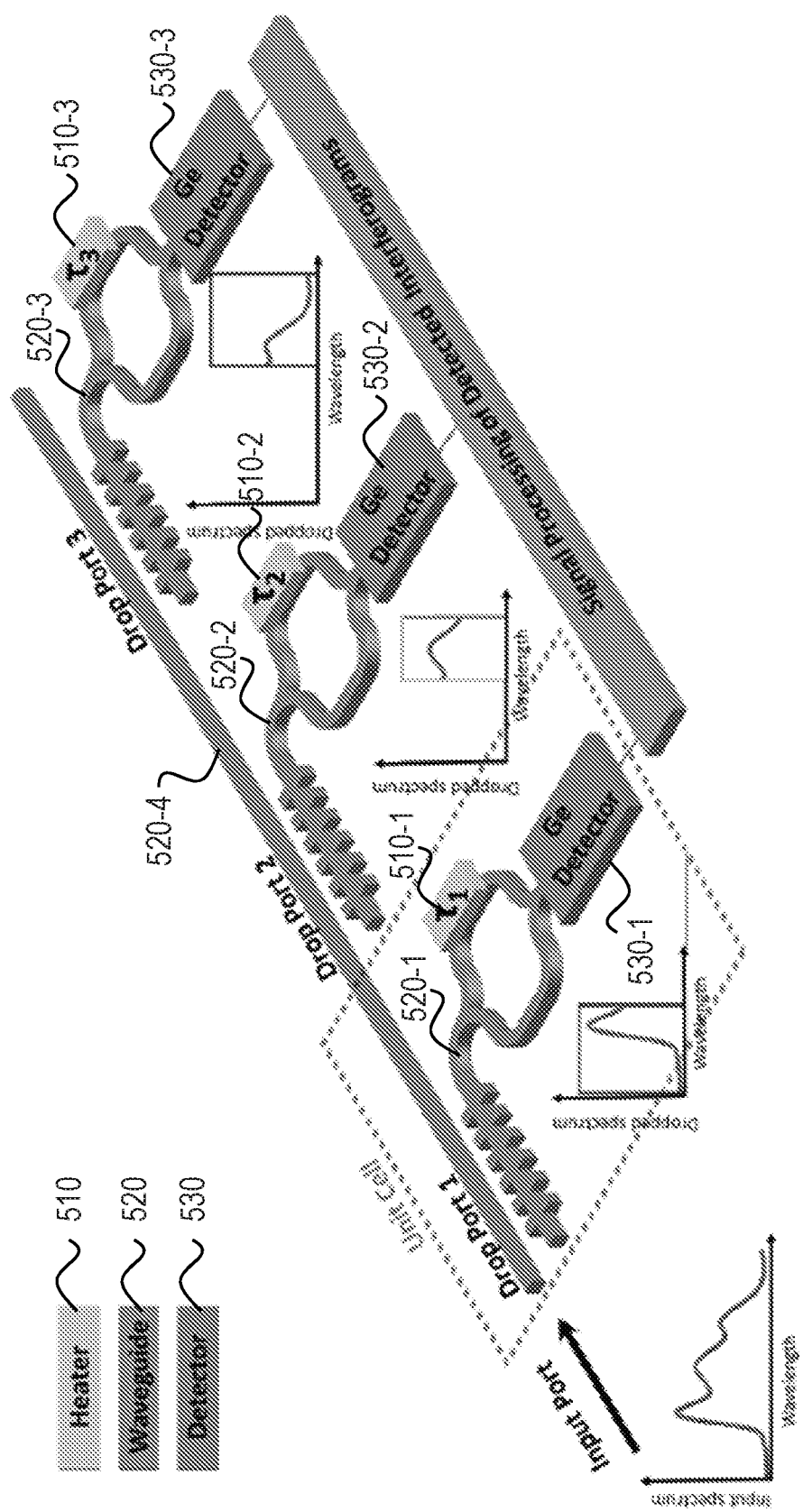
FIG. 5 shows a schematic illustration of an example of an integrated Fourier transform (FT) spectrometer, in accordance with some embodiments of the presently disclosed technology.
Figure 6:
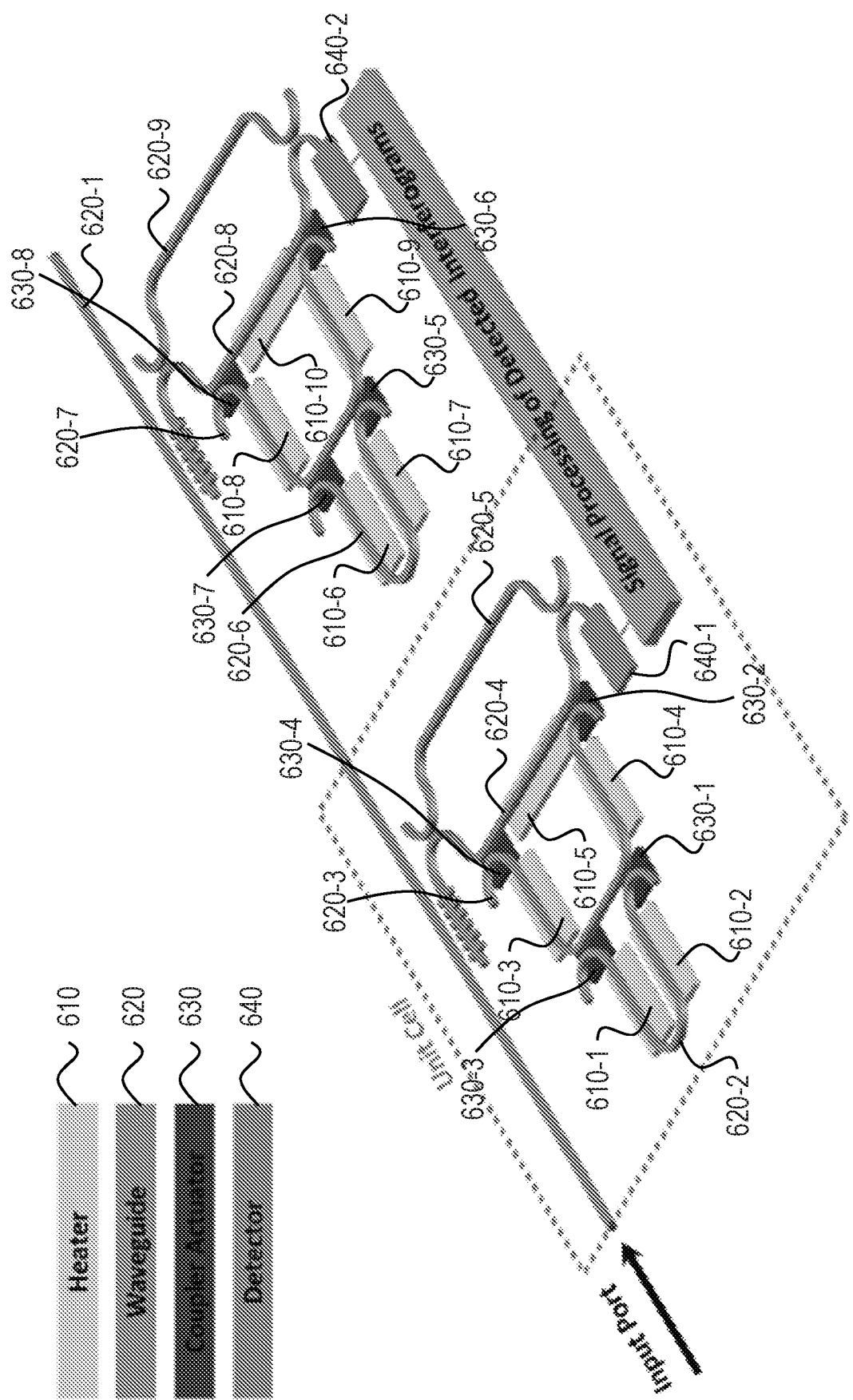
FIG. 6 shows a schematic illustration of another example of an integrated FT spectrometer, in accordance with some embodiments of the presently disclosed technology.
Figure 7:
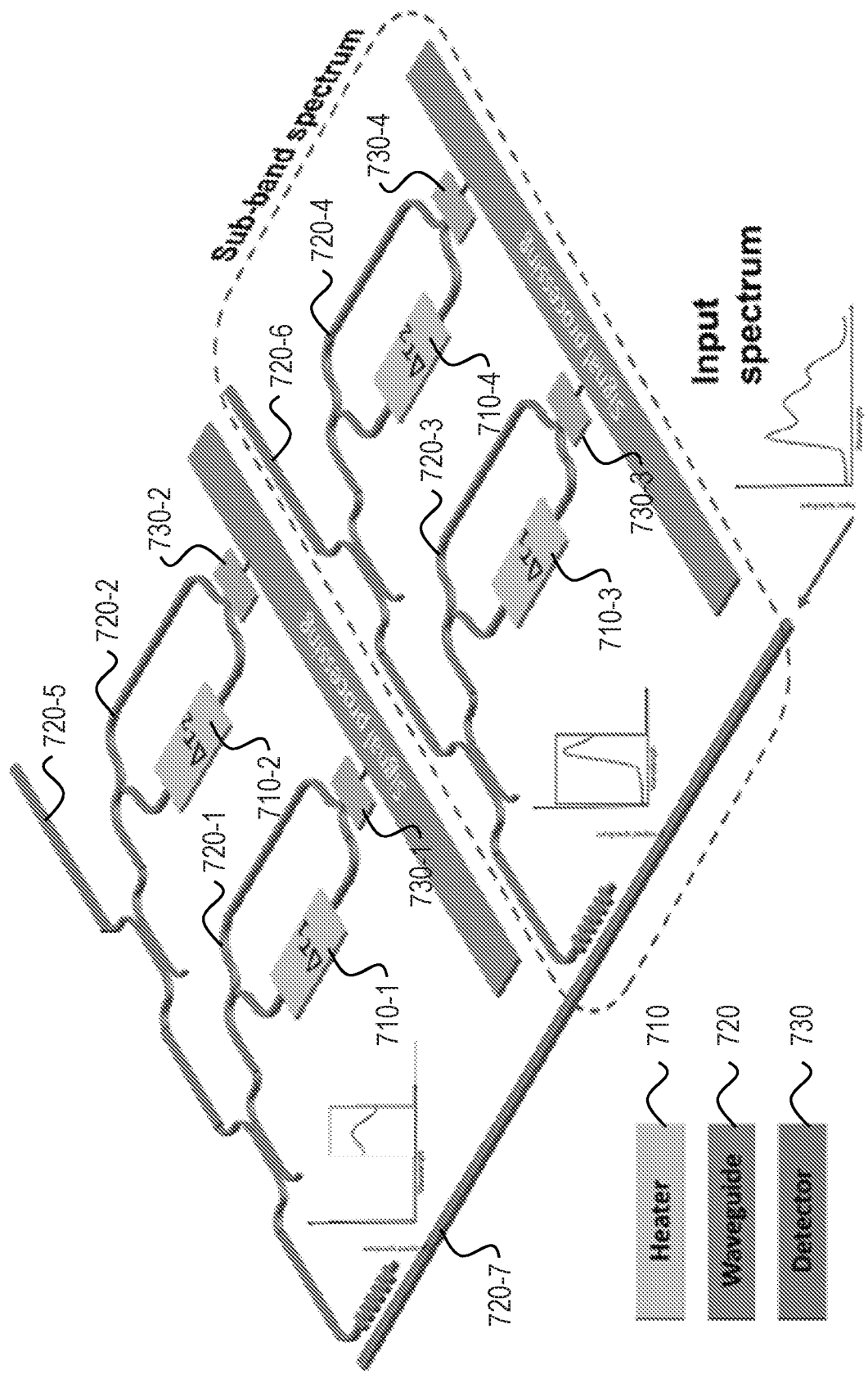
FIG. 7 shows a schematic illustration of yet another example of an integrated FT spectrometer, in accordance with some embodiments of the presently disclosed technology.

FIGS. 5-7 show schematic illustrations of exemplary integrated FT spectrometers.

FIG. 5 shows a schematic illustration of an example of an integrated Fourier transform (FT) spectrometer, in accordance with some embodiments of the presently disclosed technology. As shown in FIG. 5, an example of an FT spectrometer may include a number of modular unit cells, each analyzing a separate spectral partition. As shown therein, each unit cell may be comprised of two primary components: a Fourier transform spectrometer (e.g., detectors 530-$i$) and a bandpass filter (e.g., waveguides 520-I with heaters 510-$i$) that feeds it. In an aspect, a digital Fast Fourier transform (FFT) of each channel interferogram yields a corresponding channel spectrum, and through calibrated summation of the channel spectra, the final spectrum is recovered.

In some embodiments, and as shown in FIG. 5, the physical layout of the device is a waveguide bus with serial drop-filters along the waveguide path that each feed to an integrated FTS implemented as an integrated Mach Zehnder interferometer (MZI) with thermo-optically actuated optical path-difference. Each drop filter may collect a different sub-band from the input signal spectrum and pass it through a tunable integrated MZI. The drop filters are designed to cover the entire signal bandwidth with overlap at the filter edges to account for total spectral coverage of the input signal bandwidth.

FIG. 6 shows a schematic illustration of another example of an integrated FT spectrometer, in accordance with some embodiments of the presently disclosed technology. The example shown in FIG. 6 includes components that are similar to those described in FIG. 5 (e.g., heaters 610-$i$, waveguides 620-$i$ and detectors 640-$i$), and will not be described separately in this section. The variant of the integrated CDFT spectrometer shown in FIG. 6 includes tunable couplers (e.g., using coupler actuators 630-$i$) to redirect the input signal to sequentially longer sections of the waveguide. This extends the effective length of the MZI, and therefore the resolution limit of the exemplary device.

Moreover, by enabling the tuning of the optical path length beyond the limit of a single arm device, limitations on arm length set by fabrication tolerances are removed. Since the couplers occupy a lot of area, the extended versions will use both thermal tuning to the extent possible, only then moving to a physically longer arm. The signal processing section of the device will then stitch together the various delayed signals. The spectral partitioning of the CDFT design must be retained because the tunable evanescent couplers only work over a limited bandwidth.

FIG. 7 shows a schematic illustration of yet another example of an integrated FT spectrometer, in accordance with some embodiments of the presently disclosed technology. The example shown in FIG. 7 includes components that are similar to those described in FIGS. 5 and 6 (e.g., heaters 710-$i$, waveguides 720-$i$ and detectors 740-$i$), and will not be described separately in this section. In an example, the space available on the substrate can further be utilized to improve spectral resolution by extending the row of MZIs, each acting as spectral channels, to a matrix of MZIs, with a spectral channel row now an array of MZIs, as seen in FIG. 7.

For each sub-band of the signal spectrum dropped into a row channel, the same sub-spectrum may be passed to each interferometer (albeit attenuated by the power division). The MZIs may be tuned to measure the interference of the sub-band spectrum over a different range of optical path differences, such that when run in parallel, the desired interference pattern is entirely spanned by the segment interference optical path differences of all unit MZIs. By doing so, extremely large optical path differences required for high resolution spectra otherwise unachievable in a single MZI scan can be implemented in parallel without sacrificing speed. To avoid the strain on thermal tuning, the center optical path difference of each MZI segment may be built in by designing longer paths or implementing passive phase shift components. In some embodiments, superposition of the segment interferograms may be necessary to recover the sub-band interferogram, and the CDFT interferogram may be reconstructed from the superposition of the recovered channel spectra.

In some embodiments, a device for optical spectroscopy using a Fourier transform comprises a plurality of Mach-Zehnder Interferometers (MZIs), each MZI comprising an input waveguide positioned to receive light from a broadband light source, two interferometer arms that split from the first waveguide, each of the two interferometer arms comprising a spiral and covered by a metal microheater, and an output waveguide into which the two interferometer arms recombine, wherein the light from the broadband light source is dispersed into a plurality of spectral channels upon passing through the plurality of MZIs, wherein a one-dimensional Fourier transform of each of the plurality of spectral channels is computed to produce each of a plurality of channel spectrums, wherein a broadband spectrum corresponding to the light from the broadband light source is reconstructed based on the plurality of channel spectrums, wherein a calibration of each of the plurality of MZIs and a reconstruction of the broadband spectrum is based on a thermo-optical non-linearity parameter, a dispersion parameter and a transfer function of at least one of the plurality of MZIs.

The embodiment described above is not limited by only the components enumerated in the description of the above device. There may be intervening elements between two elements that are encompassed by the presently described technology. Furthermore, the described elements may possess some inherent or inferred properties or characteristics.

In an example, the embodiment further comprises a photodetector that receives the plurality of spectral channels.

In another example, the input waveguide may receive the light from the broadband light source using inverse tapers.

In yet another example, the two interferometer arms may recombine into the output waveguide through a broadband y-branch coupler.

Embodiments of the disclosed technology, as described above, may be fabricated in two stages. Initially, rapid prototyping may be performed using rigorous design and modeling tools (COMSOL, Lumerical, etc.). Embodiments may be fabricated on a silicon-on-insulator (SOI) substrate with a buried oxide layer and top crystalline silicon layer. The waveguides and heaters may be patterned via electron beam lithography, and realized via dry etching. The heaters and electronic connectors may be deposited by sputtering and lift-off processes. The initial stage may include all the functionality of the final device, apart from the integrated germanium detectors (at this stage, off-chip detection will be used for evaluation purposes). In the second stage, a multi-project-wafer (MPW) may be employed to fabricate and characterize various embodiments of the disclosed technology as described above.

Methods Related to Embodiments of the Disclosed Technology

As discussed above, some advantages of the disclosed technology include relaxing the sampling rate and dynamic range requirements of chip-scale Fourier transform spectrometers. A free-space channel dispersive Fourier transform (CDFT) spectrometer design may be employed to more efficiently utilize the total pixel count of imaging detectors, whereas an integrated spectrometer may use channel dispersion to improve spectral acquisition speed and improve signal sensitivity. To achieve this, in some embodiments, an array of FTS interferometers may be implemented on the single chip, and a single input signal is spectrally multiplexed through the interferometer array.

The advantage of this partitioning is as follows: by reducing the bandwidth analyzed by each spectrometer the sampling rate requirements may be relaxed, and therefore the speed of the measurement process is improved. In some embodiments, increasing the number of spectral partitions may provide a greater improvement in measurement speed. Moreover, the reduction of signal bandwidth in each channel reduces the dynamic range of the channel interferogram; thus, the dynamic range of the detector is better matched to the interferogram dynamic range and signal fidelity is significantly improved.

In some embodiments, the disclosed technology may retain the advantages of FTS has compared to other spectrometer designs, including optical power throughput, operation in noisy environments, and detection accuracy. In some embodiments, monolithic integration of the integrated CDFT spectrometer may provide a high signal-to-noise ratio and increased sensitivity. In some embodiments, the addition of heterogeneously integrated light sources and other optical components required for a fully functional spectrometer can be realized in a single chip.

Figure 8:
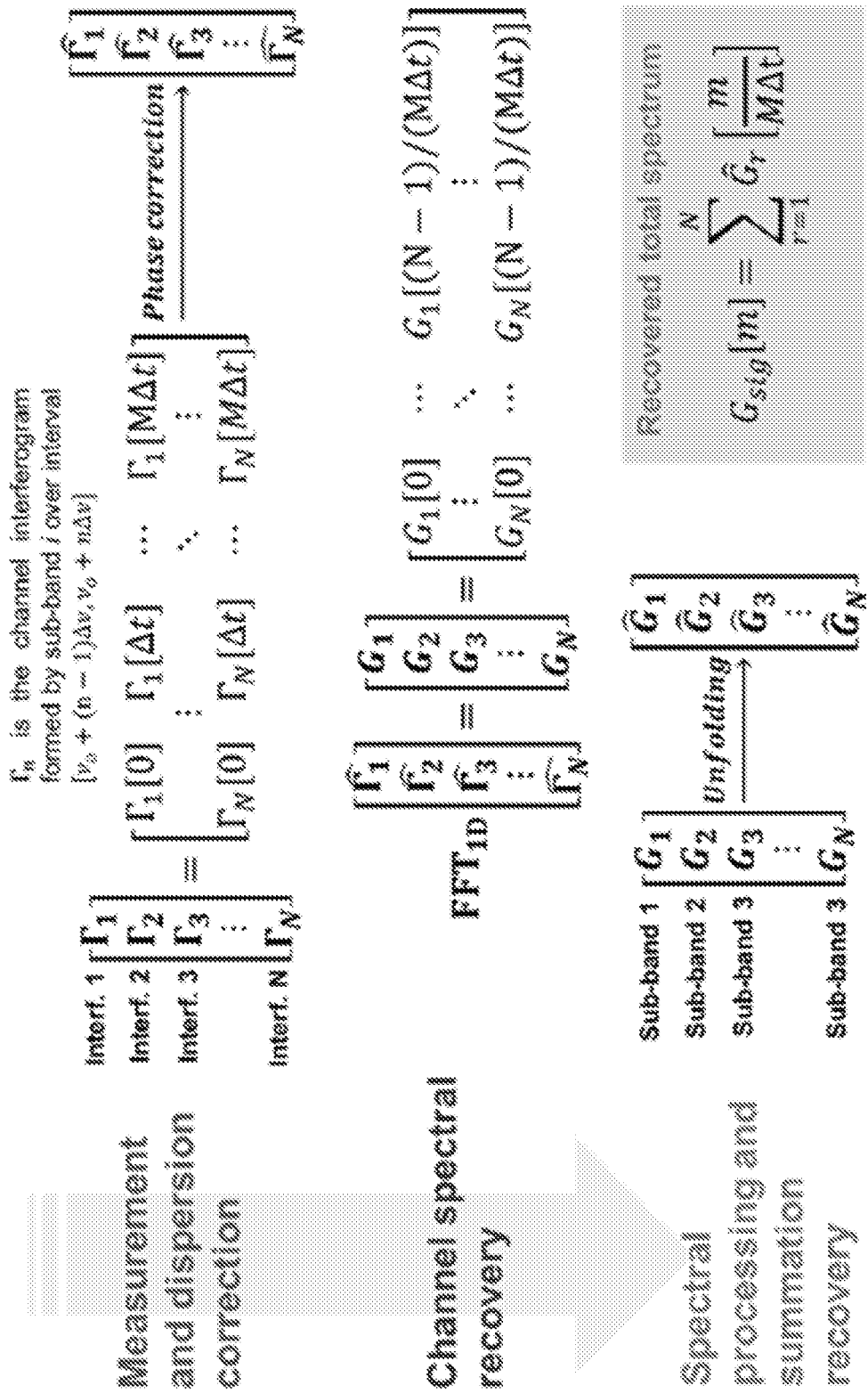
FIG. 8 shows an overview of exemplary spectral analysis and signal processing methods, in accordance with some embodiments of the presently disclosed technology.

FIG. 8 shows an overview of exemplary spectral analysis and signal processing methods, in accordance with some embodiments of the presently disclosed technology. In some embodiments, and through measurement, channel interferograms formed by each sub-band of the total signal spectrum (represented as row vectors) are sampled and assembled and phase corrections determined by calibration for each instrument are applied to the measured interferograms. In channel spectral recovery, phase corrected interferograms are Fourier transformed by FFT into corresponding sub-band power spectra (represented as row vectors). Finally, unfolding of the spectra to correct for bandpass sampling in each channel results in processed channel power spectra that are taken in summation along the columns to produce a final row vector $G_{sig}$ that contains the recovered total spectrum.

In other embodiments, the transmission of an unknown input to the interferometer is first monitored while an optical path difference is created between the arms of the interferometer, resulting in a signal autocorrelation interferogram. Then, the spectral density of the input is determined by performing a mathematical transform on the interferogram. In conventional FTS, the optical path difference is created by varying the interferometer arm length, and the mathematical transform in the ideal case is the Fourier transform. In the integrated FTS the optical path difference is created by varying the interferometer arm refractive index (in this case using the thermo-optic effect), and the mathematical transform in the ideal case is a Fourier transform with some additional scaling to account for waveguide dispersion.

The signal autocorrelation is obtained by sampling the interferogram. An optical field random process E(t) is passed through the MZI to obtain the autocorrelation samples determined by the MZI tuner with M samples in steps of time delay Δt and processed through FFT to recover the power spectrum density G:

$$\Gamma[n] = \langle E(t)E^*(t-n/\Delta t)\rangle_t \underset{FT}{\leftrightarrow} G[m] = \sum_{m=0}^{M-1} \Gamma[m]e^{-im\Delta t\omega}$$

Where m, n are the integer sample numbers and Δt is the sample time delay. The maximum optical delay traversed is MΔt and is a rectangular function apodizing the ideal interferogram; this determines the spectral resolution to be Δv=1/(MΔt) where the power spectral density is convolved with the Fourier conjugate sinc of the measurement window. To avoid aliasing of the signal bandwidth B, the sampling theorem places a restriction on Δt<1/2B, or equivalently in the number of samples M>2B/Δv.

This is the primary result that pertains to the proposed device, and is analogous to the Nyquist theorem from digital signal processing. Namely, from the equation above it is clear that the greater the bandwidth that must be measured, the shorter the optical time delay steps are required of the tunable interferometer arm. This corresponds physically to a smaller temperature step size generated by the integrated heaters. Since device heating is a relatively slow process, this places a fundamental limit on the operating speed of the device. However, the solution to improving the operating speed is clear: partition the spectra into a number of smaller bandwidth channels, and analyze each of these channels separately which is the main premise of the proposed device. The total signal bandwidth in each channel is reduced by the number of partitions implemented, relaxing the sampling rate in each channel required to accurately sample the sub-band interferogram. In particular, if N channels are implemented for a signal of total bandwidth B, the bandwidth per channel is now B/N, and the number of samples required is now $M_{channel}$>2B/(NΔv).

Exemplary Signal Reconstruction Methods

Signal reconstruction may begin with each channel MZI being scanned to measure respective sub-band interferograms. As per the partition, each autocorrelation interferogram may be Fourier transformed individually, recovering a set of complex sub-band spectra wherein the phase is preserved. The issue of aliasing due to the large optical carrier component is mitigated by the channelization process. Owing to the large optical carrier component, the sub-band spectral components exceeding the carrier are folded into the sampling space and would otherwise be aliased by a single MZI construction.

However, in CDFT spectrometers, the channels separate the aliased components, and the folded spectra can be unfolded to correctly place the spectrum. Because the center frequency is unchanged by the channelization, reduced sample rates inevitably lead to folding across the Nyquist frequency edge and into the sample frequency space. For large bandwidth signals, this results in a band of lower frequency components being oversampled, and band of higher frequency samples being undersampled. As such, aliasing takes the form of the higher frequency band folding into the lower oversampled band, and the recovered spectrum irreversibly corrupted since the components cannot be distinguished. However, channel band-limiting distinguishes and separates the undersampled high frequency band from the oversampled low frequency sub-bands into separate measurements, and thus, the folded band can be unfolded across the Nyquist edge to reconstruct the correct spectrum. This technique is an extension of bandpass sampling which is employed in signal processing to demodulate bandlimited signals from large carrier frequencies, where recovery is guaranteed by sampling above the signal Nyquist rate, at a rate much lower than the carrier frequency.

When implementing spectral filters in the integrated CDFT spectrometer, it is crucial to account for the non-idealities of the filter edges. To avoid the complete loss of spectral content between drop filters, the filters will be intentionally designed to partially overlap. Because of the multiplicative nature of transmittances, if the edge of the first filter is overlapped with the full passband of the subsequent filter, the residual signal light at a given wavenumber near the filter edge dropped into a channel will be dropped in its entirety into the subsequent channel. The linearity of the Fourier transform promises wavenumber accuracy, and as such, the leakage signal between channels will be reconstructed at their correct wavenumber in addition.

In practice, differences in dispersion between channels, while partially mitigated by proper fabrication and consistent tuners, will distort the interferogram and result in erroneous shifts between channels. In addition to the non-linear dispersion correction typically characterized for interferogram phase correction, channel-to-channel wavenumber accuracy issues can be further mitigated by proper channel characterization with a broadband calibration source over the entire spectrometer bandwidth; in particular, a frequency comb source spectrum can be measured in the CDFT system to identify irregularities in the comb spacing, or equivalently, a tunable source can be swept to detect jump irregularities when transitioning between channels. As with any spectrometer, spectral calibration should be performed for CDFT to account for optical loss, and transmission through each port should be characterized for deviations from the ideal spectrum.

As discussed previously, embodiments of the presently disclosed technology have demonstrable advantages over current FTS implementations. These include:

Resolution Advantage.

The resolution of the integrated silicon-on-insulator FST may be improved as described in the following embodiments.

1) As described previously, a single MZI with integrated heaters on top of its arms could be used as a Fourier transform spectrometer, whose spectral resolution is limited by the maximum optical length difference (OLD), which is the product of the physical arm length and the maximum amount of index change achieved by tuning the heaters. Given the same heater performance (thus maximum index change), increasing the arm length is the most straightforward method to increase the resolution. However, the propagation loss of the waveguide imposes a constraint on the arm length. The main source for propagation loss of silicon waveguide comes from the sidewall roughness, which is inevitable based on current CMOS technology. The discontinuity at the sidewall generates strong local electric field. Thus reducing the electric field strength at the sidewall could efficiently decrease the propagation loss of the waveguide. Embodiments of the presently disclosed technology use a wider multi-mode waveguide (1 um width) at the straight section in the spiral arm, as simulations confirm that there is a much weaker electric field at the sidewall in such a waveguide compared to a narrow single-mode waveguide. While the bending section in the spiral arm still uses narrow single mode waveguide (0.5 um) in order to reduce bending loss and keep footprint compact. Also, an adiabatic taper is implemented between the wide and narrow waveguides in order to avoid higher order mode.

Figure 9:
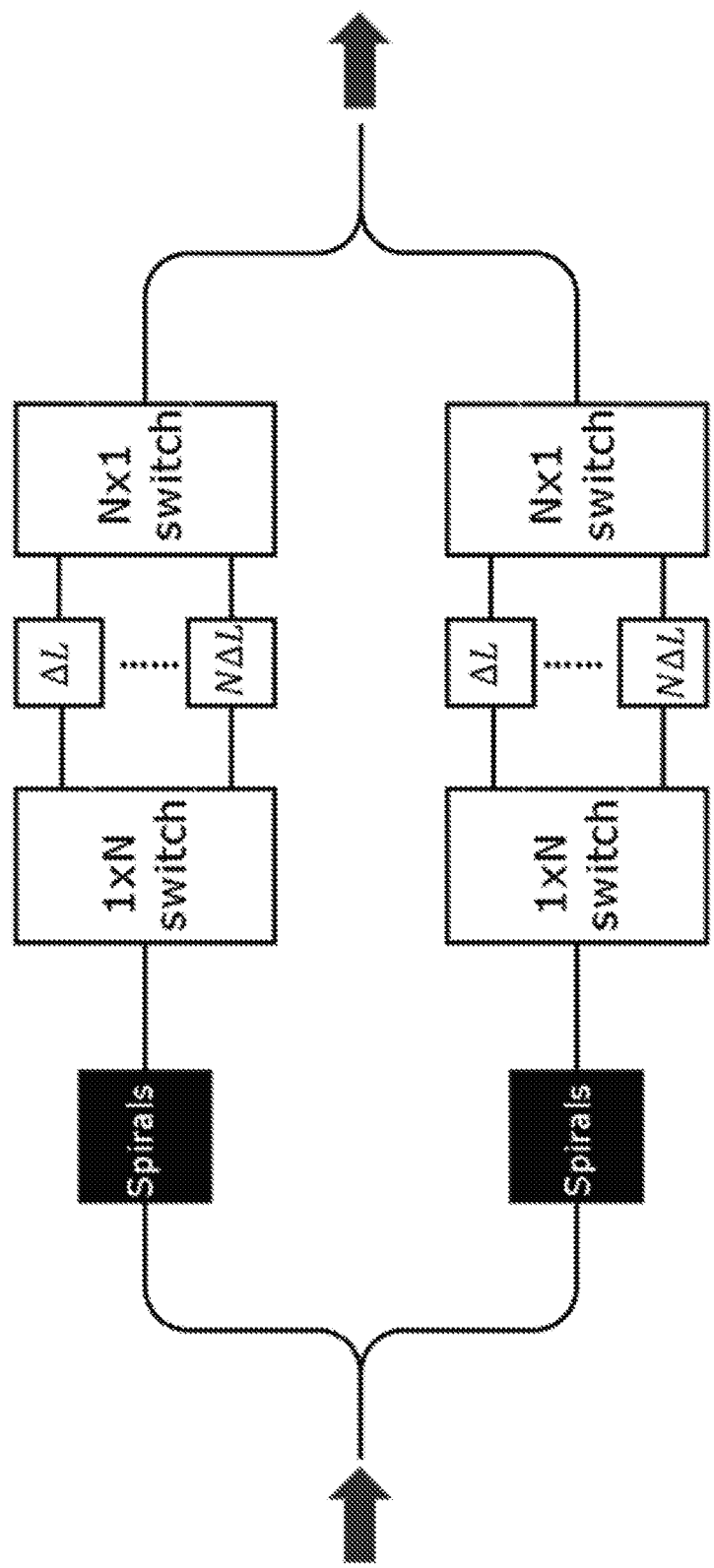
FIG. 9 shows a schematic for an exemplary system level design to increase the resolution of integrated FT spectrometers.

2) Besides increasing the resolution of a single MZI, embodiments of the presently disclosed technology may use a system level design to further enhance the resolution. The schematic is shown in FIG. 9. The input is split into two arms, each arm contains a spiral waveguide with integrated heater on top of it to tune its refractive index. Assuming the maximum index change caused by the heater for each spiral is $\Delta n$, then the maximum OLD caused by spiral with length L is $L*\Delta n$. Driving the heater on the top spiral corresponds with positive delay while driving the bottom heater induces negative delay. So a balanced MZI could delivery OLD from $-L*\Delta n$ to $L*\Delta n$. Each of the spirals is then connected to a 1×N switch, whose output ports connect to different delay lines, from $1*\Delta L$ to $N*\Delta L$. where $L*\Delta n=\Delta L*n$, so that each delay line gives an OLD that equals the maximum delay caused by driving heater on the spiral. The ends of those varying delay lines are further connected to a N×1 switch. Thus, by configuring the 1×N switch and N×1 switch, the spiral will be effectively connected with a specific delay line. As a result, the delay difference between the two arms of this MZI is reconfigurable with a maximum OLD rang of $(-N*L*\Delta n, N*L*\Delta n)$. In other words, the resolution of the Fourier Transform spectrometer increases by a factor of N.

Dynamic Range Advantage.

Intuitively, spectral channelization of the 1-dimensional interferogram into multiple MZIs may be interpreted as a bandlimited interferogram, and thus, the ratio of the autocorrelation power at the centerburst to the power at the edge may be reduced in proportion to the bandwidth reduction. For a boxcar spectrum of bandwidth B, the autocorrelation function will take the expression:

$$\Gamma(\tau)=\Gamma_0 \text{rect}(\tau/T_0)\text{sinc}(B\tau)\cos(2\nu_0\tau)$$

Herein, $\tau$ is the delay and $\nu_0$ is the center frequency or carrier. For critical sampling of the sinc function, the signal dynamic range can then be interpreted to be the ratio of the centerburst autocorrelation power to the sinc envelope at the maximum path delay given by:

$$DNR_{sig}=\Gamma_0/(\Gamma_0/BT_0)=BT_0$$

Where $T_0$ is the maximum path delay measured. Consequently, large signal bandwidths or equivalently longer path delays (for higher resolution) may result in large interferogram dynamic ranges. If $1/T_0$ is interpreted as the smallest resolvable spectral element $\Delta\nu$ determined by the maximum MZI delay, then the $BT_0=B/\Delta\nu$ has the succinct interpretation as the number of resolvable elements in the signal spectrum. Thus, increase in bandwidth and signal resolution both have the effect of increasing the interferogram dynamic range.

Since the FFT to be implemented must occur after an ADC, a fixed ADC bit-depth will inevitability incur greater quantization noise as the DNR of the signal is increased. Physically, this is a result of autocorrelation values at long path delay that fall below the single bit threshold reserved for noise. When N channel divisions are introduced by the filter drops, the total signal bandwidth in each channel can be observed to be reduced to B/N. Thus, for the same target resolution, the channel interferogram DNR can be reduced to:

$$DNR_{channel} = BT_0/N$$

Each channel interferogram may be scaled to the detector dynamic range in each channel to efficiently use the available encoding bits, which may result in the signal dynamic range in the CDFTS case being reduced and the requirement for high DNR detection being relaxed.

In some embodiment, spectral dispersion is employed in the two-dimensional interferogram, which results in the number of constructively interfering terms at the centerburst in each channel being reduced in proportion to the fraction of bandwidth reduction. A uniform quantizer is applied on each dispersed channel interferogram $I_n$ for bit depth b, and the quantized interferogram $I_{b,n}$ at sample n is given by $$I_{b,n} = \Delta_b \left\lfloor \frac{I_n}{\Delta_b} \right\rfloor$$

Where $\Delta_b = 2^{-b}$ is the quantization level for a signal normalized to one. Computing the Fourier transform in each channel yields a reconstructed spectrum $F_{b,n}$, and the quantization mean squared error (MSE) of the bit-depth b quantized signal from the ground truth reconstruction (a 64-bit quantization) is computed as follows, $$E_b = \sum_n \sum_x |F_{b,n}[x] - F_{64,n}[x]|^2.$$

Having calculated the MSE for each n-channel CDFTS recovered boxcar spectrum, the ratio of signal power to MSE or signal to quantization noise ratio (SQNR) could be computed and shown as a function of bit-depth for each channel. For larger bit depths where the error is small enough compared to the signal power for the additive noise term approximation to be valid, SQNR can be seen to be linearly proportional to bit depth in accordance with the process error of the uniform quantizer, and importantly, shows a 3 dB increase or doubling in SQNR with every doubling with the channel divisions.

Speed Advantage.

It may be desirable to increase the acquisition time of an interferogram for dynamic spectral measurement. In some embodiments, the thermo-optic tuning time is a bottleneck at a response time of about 10 µs. Channel partitioning may speed up the acquisition of spectra by reducing the number of samples required to reconstruct the signal bandwidth in each channel by lowering the Nyquist rate in each channel. In some embodiments, the interferograms may be read in parallel, which reduces the number of sequential scans to the number of samples measured in each channel.

Namely, for scan response time $\tau_S$ and $2B/\Delta\nu$ the critical number of samples required, the total time transformation is given by:

$$T_{meas} = 2B\tau_S/\Delta\nu \xrightarrow{\text{partition}} T_{meas} = T_{channel} = 2B\tau_S/(N\Delta\nu).$$

Consider a numeric example: a single scan for an integrated FTS measuring a 10,000 $cm^{-1}$ bandwidth with 0.01 $cm^{-1}$ resolution would require $2\times10^6$ samples. At a rate of 10 µs response time, this single interferogram would take 20 s to acquire. However, the implementation of 20 equal width sub-band partitions across the signal bandwidth would result in 500 $cm^{-1}$ bandwidths at the same signal resolution, reducing the number of samples to $1\times10^5$, and thus lowering the total acquisition time to 1 s. Essentially, the processing of partitioned spectral bandwidth trades chip footprint per additional channel for an increase in parallelization which reduces the total measurement time in proportion to the number of partitions.

Figure 10:
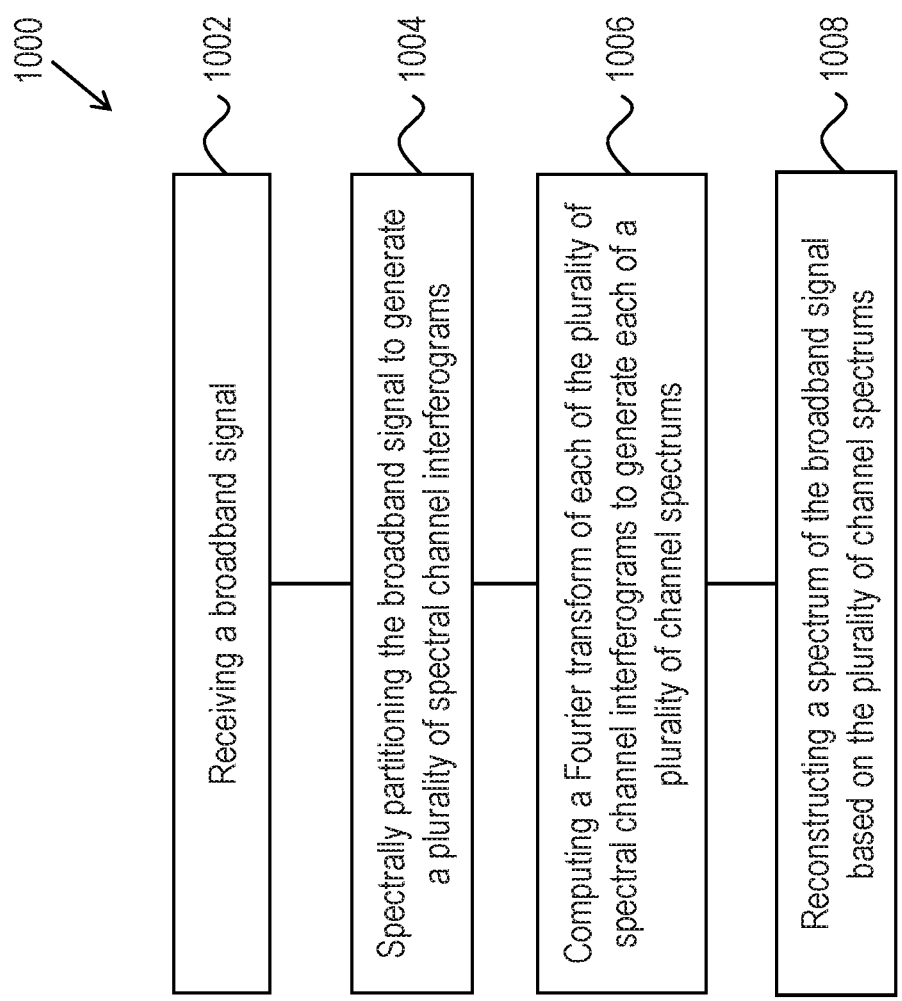
FIG. 10 shows an example of a method for optical Fourier transform spectroscopy, in accordance with some embodiments of the presently disclosed technology.

FIG. 10 shows an example of a method for optical Fourier transform spectroscopy, in accordance with some embodiments of the presently disclosed technology. The method 1000 includes, at step 1002, receiving a broadband signal that may be analyzed or characterized using embodiments of the disclosed technology.

The method 1000 includes, at step 1004, spectrally partitioning the broadband signal to generate a plurality of spectral channel interferograms. The spectral partitioning may be implemented using the various embodiments and implementations described above.

The method 1000 includes, at step 1006, computing a Fourier transform of each of the plurality of spectral channel interferograms to generate each of a plurality of channel spectrums. In an example, the transformation of the interferogram to the channel spectrum may be based on the Wiener-Khinchin theorem, which states that the autocorrelation function of a wide-sense-stationary random process has a spectral decomposition given by the power spectrum of that process.

The method 1000 includes, at step 1008, reconstructing a spectrum of the broadband signal based on the plurality of channel spectrums. In some embodiments, reconstructing the spectrum include applying an unfolding correction to at least one of the plurality of channel spectrums based on a presence of aliased spectral components to generate a plurality of corrected channel spectrums, summing the plurality of corrected channel spectrums, and applying a correction to the sum of plurality of corrected channel spectrums based on at least one of a thermo-optic non-linearity and a dispersion.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. A method for optical Fourier transform spectroscopy, the method comprising:
   receiving a broadband signal;
   spectrally partitioning the broadband signal to generate a plurality of spectral channel interferograms;
   computing a one-dimensional Fourier transform of a function of each of the plurality of spectral channel interferograms to generate each of a plurality of channel spectrums; and
   reconstructing a spectrum of the broadband signal based on the plurality of channel spectrums,
   wherein reconstructing the spectrum comprises:
      applying an unfolding correction to at least one of the plurality of channel spectrums based on a presence of aliased spectral components to generate a plurality of corrected channel spectrums,
      summing the plurality of corrected channel spectrums, and
      applying a correction to the sum of the plurality of corrected channel spectrums.

2. The method of claim 1, wherein the correction is based on at least one of a thermo-optic non-linearity, a thermal expansion and a dispersion.

3. The method of claim 1, further comprising:
   performing, prior to computing the one-dimensional Fourier transform, an analog-to-digital conversion (ADC) operation on each of the plurality of spectral channel interferograms.

4. The method of claim 3, wherein the ADC operation uses a fixed bit-depth that corresponds to a quantization error, and wherein a number of the plurality of spectral channel interferograms is based on the quantization error.

5. The method of claim 1, wherein computing the one-dimensional Fourier transform of the function of each of the plurality of spectral channel interferograms is performed in parallel.

6. A device for Fourier transform based optical spectroscopy, comprising:
   a plurality of filters configured to generate a plurality of spectral channel interferograms, wherein each of the plurality of filters is configured to filter a distinct spectral portion of an input broadband signal and generate one of the plurality of spectral channel interferograms;
   a plurality of Fourier transform spectrometers configured to generate a plurality of channel spectrums, wherein each of plurality of Fourier transform spectrometers is associated with a corresponding one of each of the plurality of filters, and wherein each of the plurality of Fourier transform spectrometers is configured to compute a Fourier transform of a function of each of the plurality of spectral channel interferograms and generate each of the plurality of channel spectrums; and
   a circuit for signaling processing configured to:
      reconstruct a spectrum of the input broadband signal based on the plurality of channel spectrums, wherein reconstructing the spectrum comprises:
         applying an unfolding correction to at least one of the plurality of channel spectrums based on a presence of aliased spectral components to generate a plurality of corrected channel spectrums,
         summing the plurality of corrected channel spectrums, and
         applying a correction to the sum of the plurality of corrected channel spectrums.

7. The device of claim 6, wherein each of the plurality of filters is a Bragg filter.

8. The device of claim 6, wherein each of the plurality of Fourier transform spectrometers comprises an interferometer, one or more waveguides, and one or more heating elements.

9. The device of claim 8, wherein the interferometer is a Mach-Zehnder interferometer.

10. The device of claim 9, wherein
    the correction is based on at least one of a thermo-optic non-linearity, a dispersion, and a transfer function of the Mach-Zehnder interferometer of at least one of the plurality of Fourier transform spectrometers.

11. The device of claim 9, wherein a resolution of one of the plurality of Fourier transform spectrometer is based on tuning a corresponding heating element and a physical armlength of a corresponding Mach-Zehnder interferometer.

12. The device of claim 8, wherein the interferometer is a Michelson interferometer.

13. The device of claim 6, wherein a filter bandwidth of a first filter of the plurality of filters partially overlaps with a filter bandwidth of a second filter adjacent to the first filter.

14. A device for optical spectroscopy using a Fourier transform, comprising:
    a plurality of Mach-Zehnder Interferometers (MZIs), each MZI comprising:
       an input waveguide positioned to receive light from a broadband light source;
       two interferometer arms that split from the input waveguide, each of the two interferometer arms comprising a spiral and covered by a metal microheater; and
       an output waveguide into which the two interferometer arms recombine,
    wherein the light from the broadband light source is dispersed into a plurality of spectral channels upon passing through the plurality of MZIs,
    wherein a one-dimensional Fourier transform of each of the plurality of spectral channels is computed to produce each of a plurality of channel spectrums,
    wherein a broadband spectrum corresponding to the light from the broadband light source is reconstructed based on the plurality of channel spectrums, and
    wherein reconstructing the broadband spectrum comprises:
       applying an unfolding correction to at least one of the plurality of channel spectrums based on a presence of aliased spectral components to generate a plurality of corrected channel spectrums, summing the plurality of corrected channel spectrums, and applying a correction to the sum of the plurality of corrected channel spectrums.

15. The device of claim 14, wherein a calibration of each of the plurality of MZIs and a reconstruction of the broadband spectrum is based on a thermo-optical non-linearity parameter, a dispersion parameter and a transfer function of at least one of the plurality of MZIs.

16. The device of claim 14, further comprising:

a photodetector that receives the plurality of spectral channels.

17. The device of claim 14, wherein the input waveguide receives the light from the broadband light source using inverse tapers.

18. The device of claim 17, wherein the input waveguide is configured to operate in a quasi-transverse electric (TE) mode.

19. The device of claim 14, wherein the two interferometer arms recombine into the output waveguide through a broadband y-branch coupler.

\* \* \* \* \*